US011268451B2

(12) United States Patent
Di Giovanni

(10) Patent No.: US 11,268,451 B2
(45) Date of Patent: Mar. 8, 2022

(54) LUBRICATING OIL DISTRIBUTOR FOR A MECHANICAL REDUCTION GEAR OF AIRCRAFT TURBINE ENGINE

(71) Applicant: SAFRAN TRANSMISSION SYSTEMS, Colombes (FR)

(72) Inventor: Jean-Charles Michel Pierre Di Giovanni, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 140 days.

(21) Appl. No.: 16/691,481

(22) Filed: Nov. 21, 2019

(65) Prior Publication Data

US 2020/0165980 A1 May 28, 2020

(30) Foreign Application Priority Data

Nov. 23, 2018 (FR) ...................................... 1871757

(51) Int. Cl.
*F16H 57/04* (2010.01)
*F02C 7/36* (2006.01)
*F02C 7/06* (2006.01)
*F16H 57/08* (2006.01)

(52) U.S. Cl.
CPC .................. *F02C 7/36* (2013.01); *F02C 7/06* (2013.01); *F16H 57/0479* (2013.01); *F16H 57/082* (2013.01); *F05D 2260/40311* (2013.01); *F05D 2260/98* (2013.01)

(58) Field of Classification Search
CPC ........... F02C 7/36; F02C 7/06; F16H 57/0479
See application file for complete search history.

(56) References Cited

U.S. PATENT DOCUMENTS

| 8,820,478 | B2 | 9/2014 | Gauthier et al. |
| 8,876,647 | B2 | 11/2014 | Gallet et al. |
| 10,458,279 | B2 | 10/2019 | Gedin et al. |
| 2013/0283756 | A1* | 10/2013 | Baker .............. F02C 7/06 60/39.01 |

(Continued)

FOREIGN PATENT DOCUMENTS

| FR | 2 987 416 A1 | 8/2013 |
| FR | 3 041 054 A1 | 3/2017 |

(Continued)

OTHER PUBLICATIONS

French Search Report and Written Opinion dated Jul. 17, 2019, for French Application No. 1871757, filed Nov. 23, 2018, 9 pages.

*Primary Examiner* — Derek D Knight
(74) *Attorney, Agent, or Firm* — Christensen O'Connor Johnson Kindness PLLC

(57) ABSTRACT

A lubricating oil distributor for a turbine engine mechanical reduction gear, for example of an aircraft, has an annular shape about an axis X and is formed of one single part. The distributor includes first and second independent oil circuits, the first oil circuit having a first oil inlet connected by a first annular chamber to several oil outlets distributed over a first circumference C1 about the axis X, and the second oil circuit having a second oil inlet connected by a second annular chamber to several oil outlets distributed over a second circumference C2 about the axis X, the first and second circumferences having different diameters.

10 Claims, 23 Drawing Sheets

(56) References Cited

U.S. PATENT DOCUMENTS

| | | | | |
|---|---|---|---|---|
| 2014/0294558 A1* | 10/2014 | Haugh | ............... | F01D 25/18 |
| | | | | 415/1 |
| 2019/0032514 A1 | 1/2019 | Gedin et al. | | |
| 2020/0166117 A1* | 5/2020 | Simon | ................. | F02C 7/06 |
| 2020/0166118 A1* | 5/2020 | Di Giovanni | ......... | F16H 57/043 |
| 2020/0191258 A1* | 6/2020 | Di Giovanni | ............ | F02C 7/36 |
| 2020/0200042 A1* | 6/2020 | Charrier | ............. | F01D 25/18 |

FOREIGN PATENT DOCUMENTS

| | | |
|---|---|---|
| WO | 2010/092263 A1 | 8/2010 |
| WO | 2017/129926 A1 | 8/2017 |

* cited by examiner

LUBRICATING OIL DISTRIBUTOR FOR A MECHANICAL REDUCTION GEAR OF AIRCRAFT TURBINE ENGINE

CROSS REFERENCE TO RELATED APPLICATION

This application claims priority under 35 U.S.C. § 119 to FRSN 1871757, filed Nov. 23, 2018, the entirety of which is hereby incorporated by reference.

TECHNICAL FIELD OF THE INVENTION

The present disclosure relates to the field of mechanical reduction gears for turbine engines, for example of an aircraft.

BACKGROUND

The state of the art comprises documents WO-A1-2010/092263, FR-A1-2 987 416, FR-A1-3 041 054 and WO-A1-2017/129926.

The role of a mechanical reduction gear is to modify the speed and torque ratio between the input axis and the output axis of a mechanical system.

New generations of bypass turbine engines, in particular, those having a high dilution rate, comprise a mechanical reduction gear to drive the shaft of a blower (also called "fan"). Usually, the reduction gear aims to transform the so-called rapid rotation speed of the shaft of a power turbine into a slower rotation speed for the shaft driving the fan.

Such a reduction gear comprises a central pinion, called a sun gear, a ring gear and pinion called planet gears, which are co-operated between the sun gear and the ring gear. The planet gears are maintained by a chassis called planet-carrier. The sun gear, the ring gear and the planet-carrier are planetary gears as their axes of revolution correspond with the longitudinal axis X of the turbine engine. The planet gears each have a different axis of revolution evenly distributed over the same pitch diameter around the planetary gear axis. These axes are parallel to the longitudinal axis X.

There are several reduction gear architectures. In the state of the art of bypass turbine engines, the reduction gears are of the planetary gear or epicyclic type. In other similar applications, there are so-called differential or "compound" architectures.

- On a planetary reduction gear, the planet-carrier is fixed and the ring gear constitutes the output shaft of the device which rotates in the reverse direction of the sun gear.
- On an epicyclic reduction gear, the ring gear is fixed and the planet-carrier constitutes the output shaft of the device which rotates in the same direction as the sun gear.
- On a compound reduction gear, no element is fixed in rotation. The ring gear rotates in the opposite direction of the sun gear and of the planet-carrier.

The reduction gears can be composed of one or more meshing stages. This meshing is ensured in different ways, such as by contact, by friction or also by magnetic fields.

There are several types of meshing by contact, such as with spur gears or herringbone gears.

The present disclosure proposes an improvement of a reduction gear with a simple, effective and economic solution to improve the circulation and/or the evacuation of oil in a turbine engine.

SUMMARY

In one aspect, the present disclosure provides a baffle for a turbine engine mechanical reduction gear, for example of an aircraft, this baffle being configured to be inserted between two adjacent planet gears of the reduction gear, this baffle comprising a block comprising a first lateral surface which is cylindrical and concave and which has a bend radius R1 measured from an axis G1, the block comprising a second lateral surface, opposite the first surface, which is cylindrical and concave and which has a bend radius R1 measured from an axis G2 which is parallel to G1, wherein it comprises, on each of the first and second surfaces, at least one protruding strip which has a general extended shape about the axis G1, G2 of the surface considered, and whose inner periphery is concave curved and has a bend radius R2 measured from this axis G1, G2 which is less than R1.

The baffle thus comprises strips on these cylindrical surfaces surrounding the planet gears. Each of these strips is configured to be co-operated in an inter-propeller groove of the gearing of a planet gear, and to extend along this groove. A planet gear indeed comprises a gearing with at least two propellers (respectively front and rear), i.e. a gearing comprising two adjacent toothed annular strips. These two propellers are separated from one another by an annular groove. It is therefore understood, that the propellers of a planet gear are separated by the strip of a baffle, in the installation zone of this baffle. The strip has the function of "inter-propeller baffle" which adds itself to the main function of the "inter-planet gear baffle".

This aspect makes it possible to prevent the recirculation of oil and of particles between the front and rear propellers of the planet gears. There are many benefits brought by this baffle: no recirculation of oil between the propellers, therefore better evacuation of calories generated when functioning, limitation of transitions of particles, rigidification of the structure of the baffle, etc.

This aspect is compatible with any type of reduction gear (planetary gear, epicyclic gear, etc.). It is also compatible with any type of gearing (spur gear, herringbone gear) on the condition that this gearing comprises at least two propellers. It is furthermore compatible with any type of planet-carrier, whether it is one-piece or of the cage-carrier type. Finally, it is compatible with any type of planet gear bearing, whether it is composed of rolling elements, a hydrodynamic bearing, etc.

The baffle according to the present disclosure can comprise one or more of the following features, taken individually from one another, or in combination with one another:
- the baffle comprises one single strip producing over each of the surfaces, e.g., substantially at the middle of the surface; functionally, it may be opposite the recess or groove of the planet gears which are located between their two propellers,
- the baffle comprises several strips protruding over each of the surfaces,
- each strip has a circumferential extent which is less than or equal to the circumferential extent of the surface on which it is situated,
- each strip has a circumferential extent which is greater than the circumferential extent of the surface on which it is situated; end portions of the strips can thus extend protruding over the baffle,
- the baffle comprises tapped holes for receiving fixing screws from the baffle to a planet-carrier of the reduction gear,
- the baffle comprises an integrated lubricating circuit, the circuit comprises an oil inlet connected by bores to at least one oil outlet, the oil inlet comprises a connecting pipe by male-female press-fitting, the baffle comprises an oil outlet configured to receive a sealed fluidic connecting socket, the baffle comprises an oil outlet formed by a nozzle formed of one single part with the block, this nozzle may have a general extended shape and extending in a median plane of symmetry of the block.

This makes it possible to make the cantilevered nozzle for lubricating the slots of the sun gear more rigid, and to limit the number of parts and interfaces by combining the known functions of the baffle and of the nozzle while preserving and facilitating the mounting of the baffle. The benefits brought are, for example: a shorter nozzle (less subjected to vibrations), fewer parts and therefore fewer references, less machining and less mounting, etc.

The present disclosure also relates to a planet-carrier for a turbine engine mechanical reduction gear, for example, of an aircraft, comprising a cage defining a housing for receiving a central sun gear of axis X of rotation, of planet gears arranged around the sun gear and each comprising a double-propeller gearing, as well as baffles such as described above, which are each fixed to the cage and inserted between two adjacent planet gears, such that their strips are engaged in inter-propeller grooves of the gearings of the planet gears.

Advantageously, one of the baffles of the planet-carrier comprises a nozzle which is oriented in the radial direction with respect to the axis X and inwards so as to be capable of projecting the oil over the inner slots of the sun gear.

Advantageously, the cage comprises a radial wall comprising a central orifice of which a radially inner peripheral edge comprises one or more notches to facilitate the mounting of baffles and comprising the nozzle.

According to a second aspect, the present disclosure relates to a lubricating and cooling hub for a turbine engine mechanical reduction gear, for example of an aircraft, wherein it is configured to be mounted in an axis of a planet gear of the reduction gear, and comprises first and second coaxial and substantially truncated plates, each comprising a first end of a greater diameter and a second opposite end of a smaller diameter, the plates being fixed together by their second ends and being configured to extend inside the axis and to cover at least one radially inner surface of this axis to define with it, at least one annular cavity for circulating oil for lubricating and cooling this axis, the second ends of the first and second plates comprising means for fluidically connecting at least one cavity to a lubricating and cooling oil source, e.g., a conduit or channel.

The hub has the function of receiving lubricating oil then distributing it and conveying it to different elements of the reduction gear. The hub comprises two separate circuits, which is advantageous, as the circuits can make the oil circulate at different flows and/or at different temperatures, and limits the transfer of pollution. The one-piece design of this hub makes it possible to facilitate its mounting in the reduction gear, to optimise its mass, and to limit the vibratory phenomena. The diameter of this hub is advantageously selected to facilitate its integration in the reduction gear. The diameter of the reduction gear and of its chambers is, for example, less than the outer diameter of the planet-carrier (or of the cage or of the cage-carrier of the planet-carrier) and greater than the outer diameter of an input shaft of the reduction gear which is engaged in the sun gear and coupled to the sun gear. This input shaft can comprise a depressed section conferring a certain flexibility to the shaft to better correct the misalignments of the engine shaft.

The benefits brought by this aspect are: a better integration of the hub in the engine, a significant freeing of space to increase the size of the flexibility of the engine shaft (which makes it possible for a better correction of the misalignments of the reduction gear), a potentially more rigid structure (and therefore less subjected to vibratory phenomena), one same possible connecting interface for the different oil outlets, a shorter oil path with less load loss, etc.

This second aspect is designed for a reduction gear of planetary-type, but could be compatible with an epicyclic reduction gear by means of a few arrangements. It is compatible with any type of gearing (spur, herringbone), as well as any type of planet-carrier whether it is one-piece or of cage- and cage-carrier-type. Finally, this aspect is compatible with any type of planet gear bearing, whether it is composed of rolling elements, a hydrodynamic bearing, etc.

The hub according to the present disclosure can comprise one or more of the following features, taken individually from one another, or in combination with one another:

each of the first ends, or even also each of the second ends, comprises an outer, centering cylindrical surface comprising an annular recess for receiving a seal, one of the plates comprises an inner chamber centered on an axis Y common to the plates, this chamber being connected, on the one hand, by radial passages formed in this plate or between the two plates to the at least one annular cavity, and on the other hand, to a connecting pipe centered on the axis Y, the pipe is configured to co-operate by male-female press-fitting, for example with a fluidic connecting socket which can be used to connect the pipe to a lubricating oil distributor, the chamber has a general cylindrical shape, centered on the axis Y and comprises a longitudinal end connected to the pipe and an opposite longitudinal end which is either closed, or open, and which opens into another chamber, this other chamber being formed in the other plate and being connected by other radial passages to the at least one annular cavity, the plates are configured to be fixed to one another and only one to the other, the plates are configured to be fixed to one another, as well as an annular flange for fixing the planet gear axis, the plates bear on either side of the flange; as there is no longer any clearance, the hub cannot be translated along the axis Y; the mounting is therefore less hyperstatic, the plates are fixed by one or more screws distributed about the axis Y; as the fixing means do not correspond with the axis of the bearing and that it passes through a passage hole of the latter, this prevents the hub from rotating on itself; the hub therefore has the last degree of its freedom blocked, the hub comprises an inner chamber which is sized to ensure a distribution of oil by its slowing down, making it possible to reduce the kinetic effects of the fluids.

The present disclosure also relates to a planet gear axis for a turbine engine mechanical reduction gear, for example of an aircraft, this axis having a general tubular shape and comprising substantially radial orifices extending between at least one radially inner surface of this axis and the outer periphery of this axis, a hub such as described above being mounted in this axis and covering the at least one surface.

The axis according to the present disclosure can comprise one or more of the following features, taken individually from one another, or in combination with one another:

- the outer periphery of the axis is configured to define at least one, e.g., two, bearing roller track(s),
- the inner periphery of the axis is of the biconical type and comprises, for example, two truncated surfaces, coaxial and flaring in opposite directions, these two truncated surfaces being covered by the plates and defining with these plates, one or two annular cavity(ies) for circulating oil.

According to a third aspect, the present disclosure relates to a lubricating oil distributor for a turbine engine mechanical reduction gear, for example, of an aircraft, wherein it has a general annular shape about an axis X and is formed of one single part, this distributor comprising first and second independent oil circuits, the first oil circuit comprising a first oil inlet connected by a first annular chamber to several oil outlets distributed over a first circumference C1 about the axis X, and the second oil circuit comprising a second oil inlet connected by a second annular chamber to several oil outlets distributed over a second circumference C2 about the axis X, the first and second circumferences having different diameters.

The axis of a reduction gear planet gear is guided by at least one bearing. The heat generated by the passage of mobile elements of the roller of the bearing must be evacuated. The bearing is supplied with oil through orifices passing radially through the axis of the planet gear. The circulation of this oil inside the planet gear axis and, for example, over the inner periphery of the axis, makes it possible to absorb the calories generated by the bearing when functioning. These calories are transmitted by conduction from the inner ring of the bearing, which can be integrated at the outer periphery of the axis of the planet gear, to the inner periphery of this axis. The present disclosure is applied to various shapes of the inner periphery of the planet gear axis, and for example, a biconical inner periphery. The two oil circuits of the distributor are independent insofar as the annular chambers are closed over all of their periphery and do not communicate together. In addition, the use of two independent plates makes it possible to fit any shapes of the inner periphery of an axis, and for example, a biconical shape, in order to form one or more cavities for circulating oil for lubricating and cooling the axis.

The proposed solution is compatible with any type of reduction gear (planetary gear, epicyclic gear, etc.). This solution is compatible with any type of gearing (spur, herringbone), and of any type of planet-carrier whether it is one-piece or of cage-carried type. Finally, the solution is only compatible with planet gear bearings composed of rolling elements (ball bearings, roller bearings, conical roller bearings, etc.).

The distributor according to the present disclosure can comprise one or more of the following features, taken individually from one another, or in combination with one another:

- the first and second inlets are oriented in the radial direction with respect to the axis X,
- the first and second inlets are situated in one same plane, perpendicular to the axis X and are inclined against one another by a determined angle,
- the first and second chambers have, in the axial cross-section, a general circular shape,
- the first and second chambers are formed by two tubular rings, coaxial and closely linked,
- the diameter of the first circumference C1 is less than those of the rings, and the diameter of the second circumference C2 is greater than those of the rings,
- the outlets are axially oriented in the same direction,
- the distributor comprises fixing pads comprising orifices for the passages of screws,
- the first and second chambers each have a diameter greater than the outer diameter of a portion of a shaft configured to axially pass through the distributor; this shaft is an input shaft of the reduction gear,
- the diameter and the orientation of the first and second chambers are arranged such that oil outlet conduits are of a similar length; this arrangement also makes it possible to have oil inlet conduits of the shorter length, of the more linear shape, while having a comfortable bend radius; this also makes it possible that the circular cross-section conduits fully and tangentially open out to its respective chamber; it is thus possible to fulfil all these conditions, while having the axes of the oil inlet axes on one same median plane; it is advantageous, on the one hand, to have short oil inlets, in order to be able to mount the distributor which is diametrically smaller than the diameter of the cage-carrier; on the other hand, it is advantageous to have linear conduits and which fully and tangentially open into the chambers to reduce the load losses to a minimum;
- all the oil outlets, whether they are connected to the first chamber or to the second chamber, are identical; this makes it possible to have the same machining tools, the same controls and the same O-rings on the baffles as those of the hub,
- at least some oil outlets are advanced so as to go back inside the axis and inside the rear plate of the hub; this makes it possible to decrease the length of the oil conduit and to increase the rigidity of the mounting.

The present disclosure also relates to a planet-carrier for a turbine engine mechanical reduction gear, for example aircraft, comprising a cage defining a housing for receiving a central sun gear of axis X of rotation and of planet gears arranged around the sun gear, a distributor such as described above being returned and fixed on the cage.

Advantageously, the cage comprises, at its periphery, axial housings configured to receive axial fingers integral with a cage-carrier of the reduction gear, each housing being passed through by a substantially radial pin which is configured to guide in rotation a connecting means, such as a ball or a bearing, carried by one of the fingers, the first and second inlets of the distributor being oriented respectively along the first and second directions which each pass through a free space sector, axially delimited by the cage and the cage-carrier and extending circumferentially between two adjacent fingers.

The present disclosure furthermore relates to a turbine engine mechanical reduction gear, for example of aircraft, comprising at least one of the elements (baffle, hub, distributor, planet-carrier, axis, etc.) described above, as well as a turbine engine comprising such a reduction gear.

The features of the different aspects of the present disclosure can be combined with one another.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this present disclosure will become more readily appreciated as the same become better understood by reference to the following detailed description, when taken in conjunction with the accompanying drawings, wherein.

DETAILED DESCRIPTION

Figure 1:
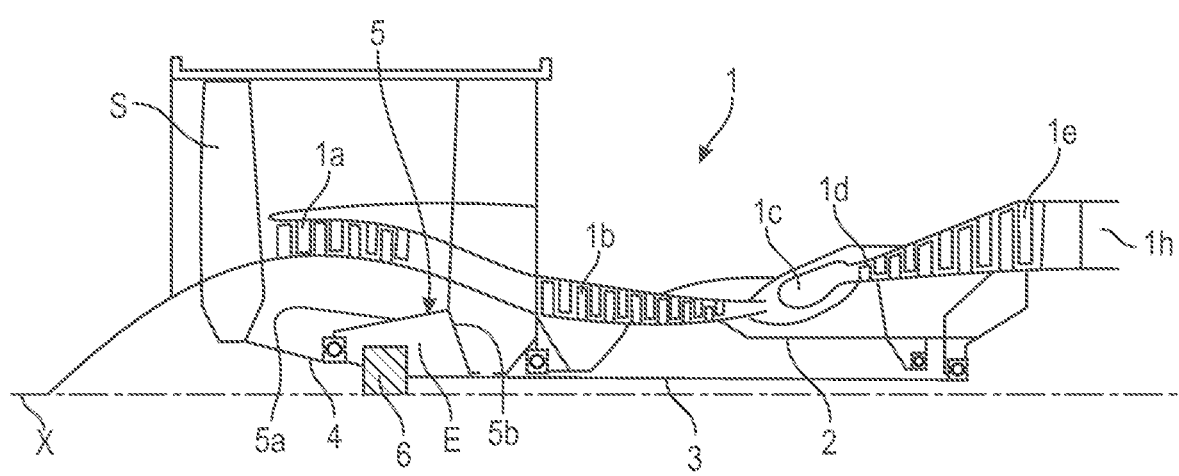
FIG. 1 is a schematic, axial cross-sectional view of a turbine engine according to one representative embodiment of the present disclosure.

FIG. 1 describes one representative embodiment of a turbine engine 1 which conventionally comprises, a fan S, a low-pressure compressor 1a, a high-pressure compressor 1b, an annular combustion chamber 1c, a high-pressure turbine 1d, a low-pressure turbine 1e, and an exhaust pipe 1h. The high-pressure compressor 1b and the low-pressure turbine 1d are connected by a high-pressure shaft 2 and form with it, a high-pressure (HP) body. The low-pressure compressor 1a and the low-pressure turbine 1e are connected by a low-pressure shaft 3 and form with it, a low-pressure (LP) body.

The fan S is driven by a fan shaft 4 which is driven to the LP shaft 3 by means of a reduction gear 6. This reduction gear 6 is generally of the planetary or epicyclic type.

Although the following description relates to a planetary or epicyclic type reduction gear, it is also applied to a mechanical compound, wherein the three components, which are the planet-carrier, the gear ring and the sun gear, are mobile in rotation, the rotation speed of one of these components for example depending on the speed difference of the two other components.

The reduction gear 6 is positioned in the front portion of the turbine engine. A fixed structure schematically comprising, here, an upstream portion 5a and a downstream portion 5b, which composes the engine or stator casing 5 is arranged so as to form an enclosure E surrounding the reduction gear 6. This enclosure E is here closed upstream by seals at the level of a bearing, making it possible for the passing through of the fan shaft 4, and downstream by seals at the level of the passing through of the LP shaft 3.

Figure 2:
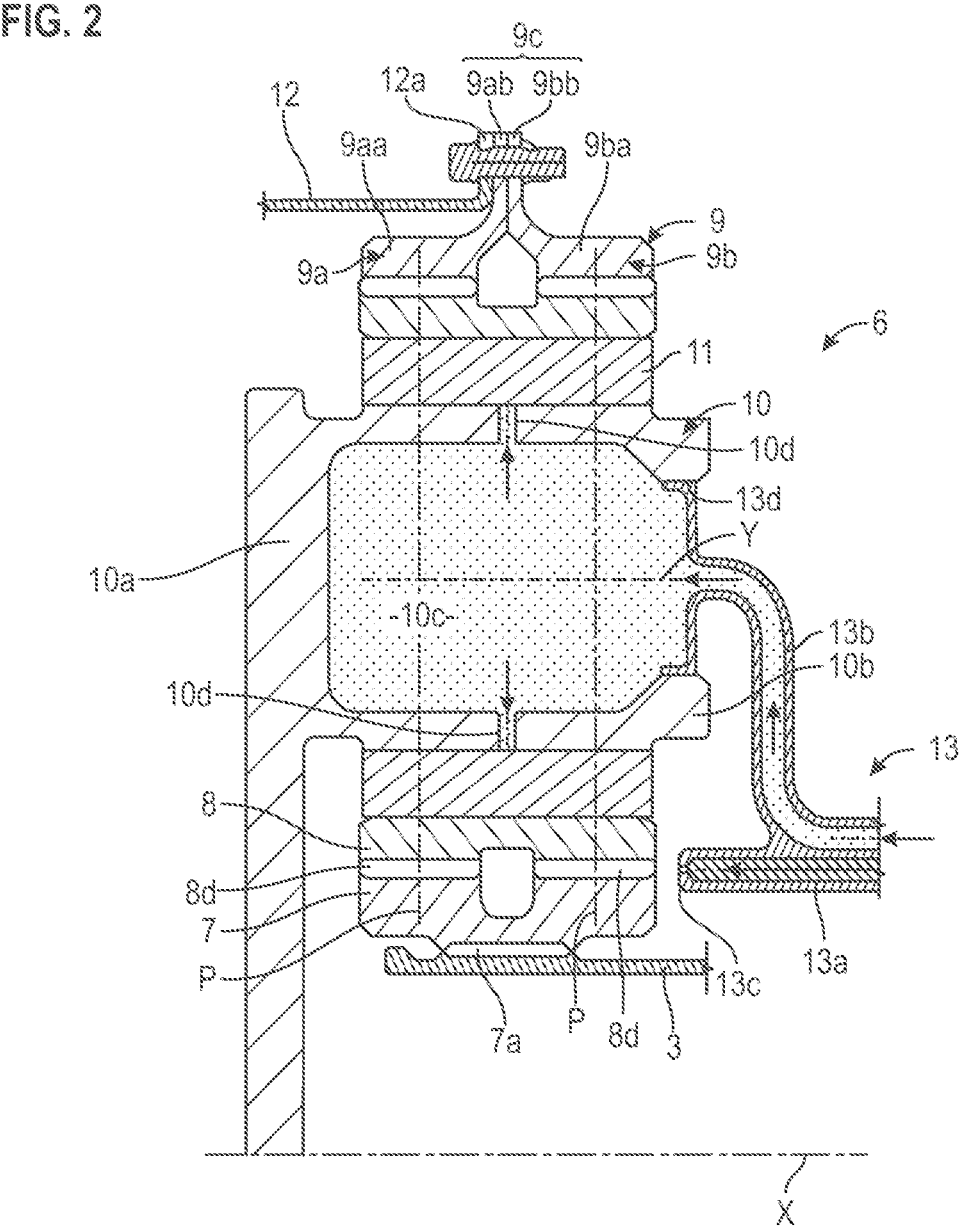
FIG. 2 is an axial cross-section in a partial view of a mechanical reduction gear.

FIG. 2 shows a reduction gear 6 which takes the shape of different architectures according to if certain parts are fixed or in rotation. At the inlet, the reduction gear 6 is connected to the LP shaft 3, for example, by way of inner slots 7a. Thus, the LP shaft 3 drives a planetary pinion called the sun gear 7. Conventionally, the sun gear 7, of which the axis of rotation is combined with that of the turbine engine X, drives a series of planet gear pinions 8, which are evenly distributed over the same diameter about the axis of rotation X. This diameter is equal to double the operating distance between the sun gear 7 and the planet gears 8. The number of planet gears 8 is generally defined between three and seven for this type of application.

All of the planet gears 8 are maintained by a chassis called planet-carrier 10. Each planet gear 8 rotated about its own axis Y, and meshes with the ring gear 9.

Resulting from this, there is:
In an epicyclic configuration, all of the planet gears 8 drives in rotation the planet-carrier 10 about the axis X of the turbine engine. The ring gear is fixed to the engine or stator casing 5 via a ring gear-carrier 12 and the planet-carrier 10 is fixed to the fan shaft 4.
In a planetary configuration, all of the planet gears 8 are maintained by a planet-carrier 10 which is fixed to the engine or stator casing 5. Each planet gear drives the ring gear, which is returned to the fan shaft 4 via a ring gear-carrier 12.

Each planet gear 8 is mounted free in rotation using a bearing 11, for example of the roller or statically indeterminate bearing type. Each bearing 11 is mounted on one of the axes 10b of the planet-carrier 10, and all the axes are positioned against one another using one or more structural chassis 10a of the planet-carrier 10. There are a number of axes 10b and bearings 11 equal to the number of planet gears. For operating, mounting, production, control, repair, or replacement reasons, the axes 10b and the chassis 10a can be separated into several parts.

For the same reasons cited above, the gearing of a reduction gear can be separated into several propellers, each having a median plane P. The functioning of a reduction gear with several propellers with a ring gear separated into two half-ring gears is detailed:

A front half-ring gear 9a constituted of a rim 9aa and a fixing half-flange 9ab. On the rim 9aa is located the front propeller of the gearing of the reduction gear. This front propeller meshes with that of the planet gear 8 which meshes with that of the sun gear 7.

A rear half-ring gear 9b constituted of a rim 9ba and a fixing half-flange 9bb. On the rim 9ba is located the rear propeller of the gearing of the reduction gear. This rear propeller meshes with that of the planet gear 8 which meshes with that of the sun gear 7.

If the propeller widths vary between the sun gear 7, the planet gears 8 and the ring gear 9, due to gearing recoveries, they are all centered on a median plane P for the front propellers and on another median plane P for the rear propellers. In the other figures, in the case of a roller bearing with two rows of rollers, each row of rolling elements is also centered on two median planes.

The fixing half-flange 9ab of the front ring gear 9a and the fixing half-flange 9bb of the rear ring gear 9b form the fixing flange 9c of the ring gear. The ring gear 9 is fixed to a ring gear-carrier by assembling the fixing flange 9c of the ring gear and the fixing flange 12a of the ring gear-carrier using a bolted mounting, for example.

The arrows of FIG. 2 describe the conveyance of the oil in the reduction gear 6. The oil arrives in the reduction gear 6 from the stator portion 5 in the distributor 13 by different means which will not be specified in this view, as they are specific to one or more types of architecture. The distributor is separated into two portions, each generally repeated from the same number of planet gears. The injectors 13a have the function of lubricating the gearings and the arms 13b have the function of lubricating the bearings. The oil is led into the injector 13a to emerge through the end 13c, in order to lubricate the gearings. The oil is also led to the arm 13b and circulates via the inlet duct 13d of the bearing. The oil then circulates through the axis in one or more buffer zones 10c to then emerge through the orifices 10d, in order to lubricate the bearings of the planet gears.

Figure 3:
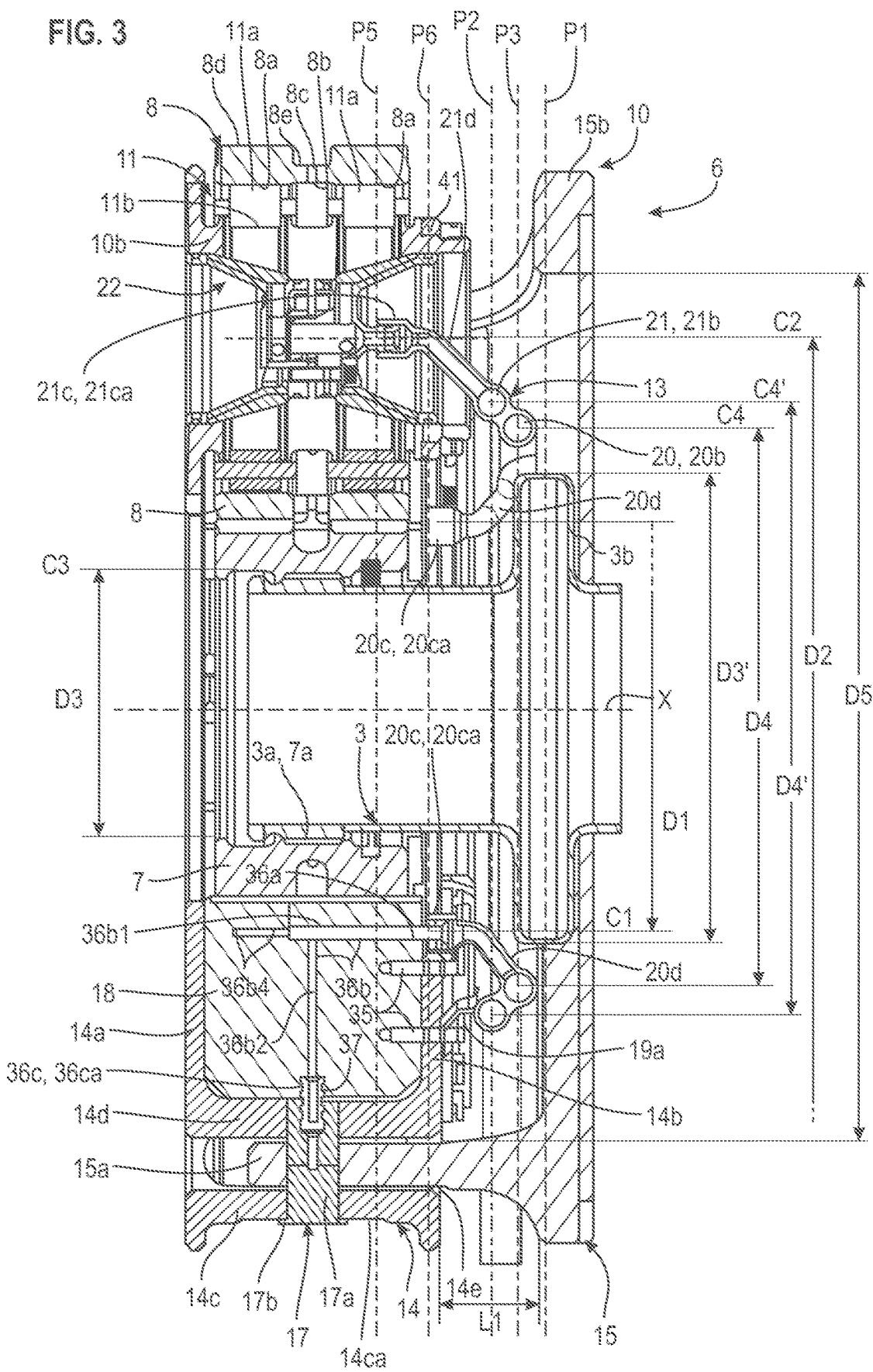
FIG. 3 is an axial cross-sectional view of a mechanical reduction gear integrating several aspects of the present disclosure.
Figure 4:
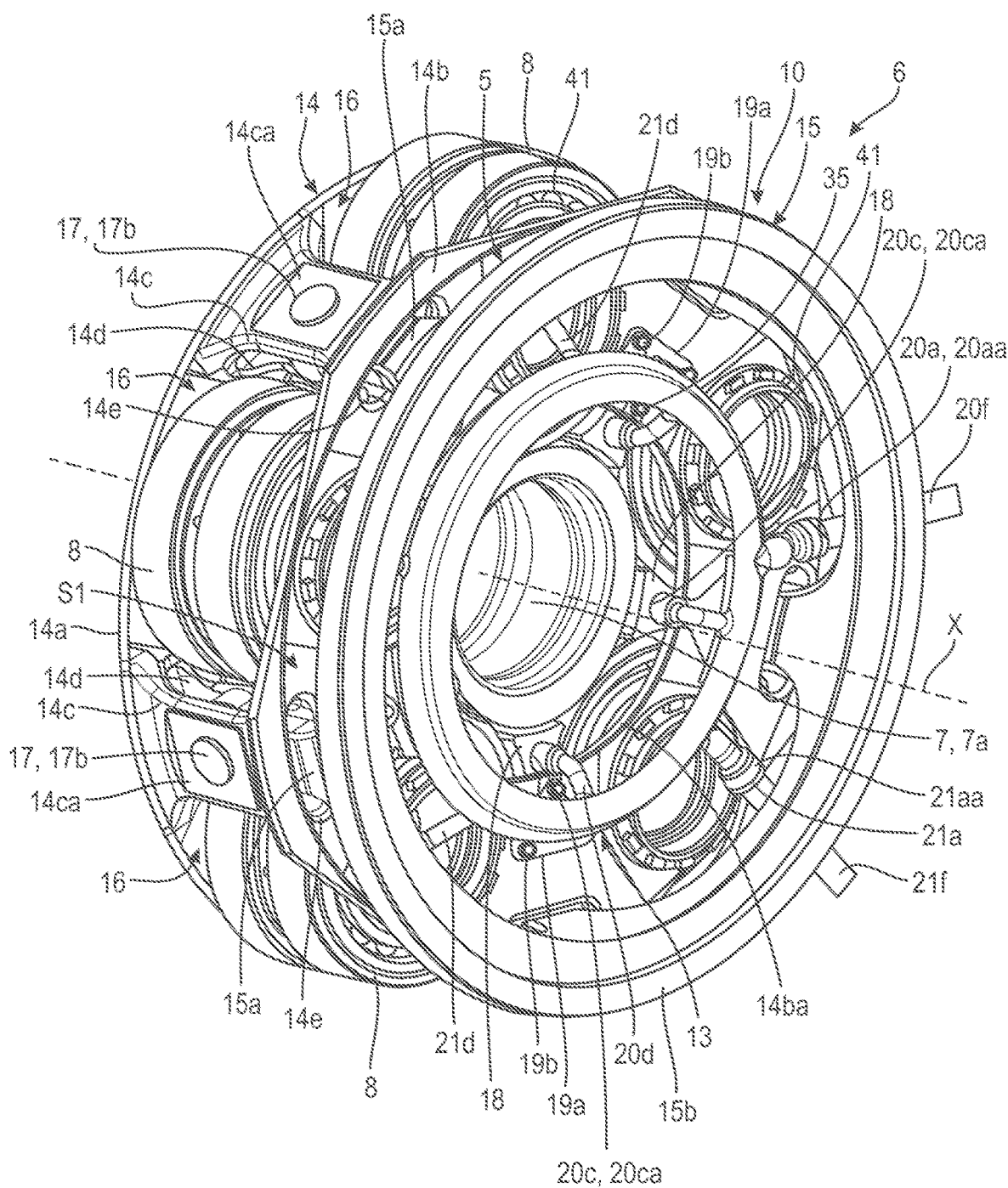
FIG. 4 is a perspective view of the reduction gear of FIG. 3.

FIGS. 3 and 4 represent an embodiment of a reduction gear 6 comprising several aspects of the present disclosure.

One of these aspects relates to a lubricating oil distributor and will be described below in reference to FIGS. 5 to 7. Another aspect of the present disclosure relates to a lubricating and cooling hub and will be described below in reference to FIGS. 8 to 13, and still another aspect of the present disclosure relates to a baffle and will be described below in reference to FIGS. 14 to 22.

The reduction gear 6 of FIGS. 3 and 4 comprises a planet-carrier 10 of the cage 14 and cage-carrier 15 type, the cage 14 and the cage-carrier 15 being connected by ball connections.

The cage 14 comprises two radial annular walls 14a, 14b extending about the axis X, these walls 14a, 14b being parallel and being respectively a front radial wall 14a and a rear radial wall 14b. The walls 14a, 14b are connected together at their outer peripheral ends by pairs of staples 14c, 14d, regularly distributed about the axis X. These pairs of staples ensure a structural connection between the walls 14a, 14b. Each pair of staples comprises two staples, respectively radially outer 14c and radially inner 14d, which extend substantially parallel along the axis X at a radial distance from one another.

The pairs of staples 14c, 14d together define spaces 16 which extend circumferentially about the axis X and are delimited axially by the outer peripheral edges of the walls 14a, 14b. There are five pairs of staples in the example represented.

Each pair of staples forms a clevis to receive a finger 15a of the cage-carrier 15. In other words, the staples of each pair together define a housing for receiving a finger 15a of the cage-carrier 15. Openings 14e of oblong shape are produced in the rear wall 14b so as to let the fingers 15a pass between the staples 14c, 14d. The wall 14a can comprise similar openings, aligned axially with the openings 14e of the wall 14b.

The number of fingers 15a is equal to the number of pairs of staples 14c, 14d and there are 5 of them in the example represented. These fingers 15a extend protruding axially upstream from the ring 15b of the cage-carrier 15 extending about the axis X. The fingers 15a of the cage-carrier 15 are engaged in the inter-staple housings by axial translation from the rear, through the openings 14e of the wall 14b.

Each finger 15a comprises, substantially in its middle, a recess for mounting a bearing configured to be passed through by a cylindrical pin 17 carried by each pair of staples 14c, 14d. Each pin 17 passes through the inter-staple housing and has a substantially radial orientation with respect to the axis X. Each pin 17 comprises a cylindrical body 17a connected to an end, here radially outer, to a collar 17b. The pin 17 is here engaged by radial translation from the outside through radial orifices of the staples 14c, 14d, its collar 17b being configured to radially bear on a flat face 14ca of the outer staple 14c. After insertion of the pin 17 in the orifices of the staples, until bearing the collar 17b on the outer staple, the collar 17b is fixed to this staple, for example, by screwing.

As can be seen in the drawings, in the assembled position, the ring 15b of the cage-carrier 15 is axially offset by a predetermined distance L1 from the rear wall 14b facing the cage 14 (FIG. 3). The annular space extending between the outer periphery of the cage 14 and the outer periphery of the cage-carrier 15 is sectored by the fingers 15a which thus together define space sectors S1 (FIG. 4).

The cage 14 defines an inner housing for receiving the sun gear 7 of axis X, planet gears 8 arranged around the sun gear 7 and meshed with it, as well as baffles 18 which will be described in detail below in reference to FIG. 14 and beyond.

As described above in relation to FIG. 2, the sun gear 7 comprises inner slots 7a for coupling to complementary outer slots 3a of the LP shaft (FIG. 3). It can be observed that the slots 3a are situated at the front end of the LP shaft 3 which comprises a downstream section 3b in a depressed form. This section 3b is here situated in a plane P1 perpendicular to the axis X which is axially offset from the cage 14 of the planet-carrier 10 and which passes substantially through the ring 15b of the cage-carrier 15 in this example. This section 3b gives the LP shaft 3 a certain flexibility limiting the transmission of forces from the engine when functioning to the reduction gear. The slots 3a are here situated over a circumference C3 of axis X and of diameter D3, and the section 3b has an outer diameter D3' and less than the inner diameter D5 of the ring 15b.

Figure 5:
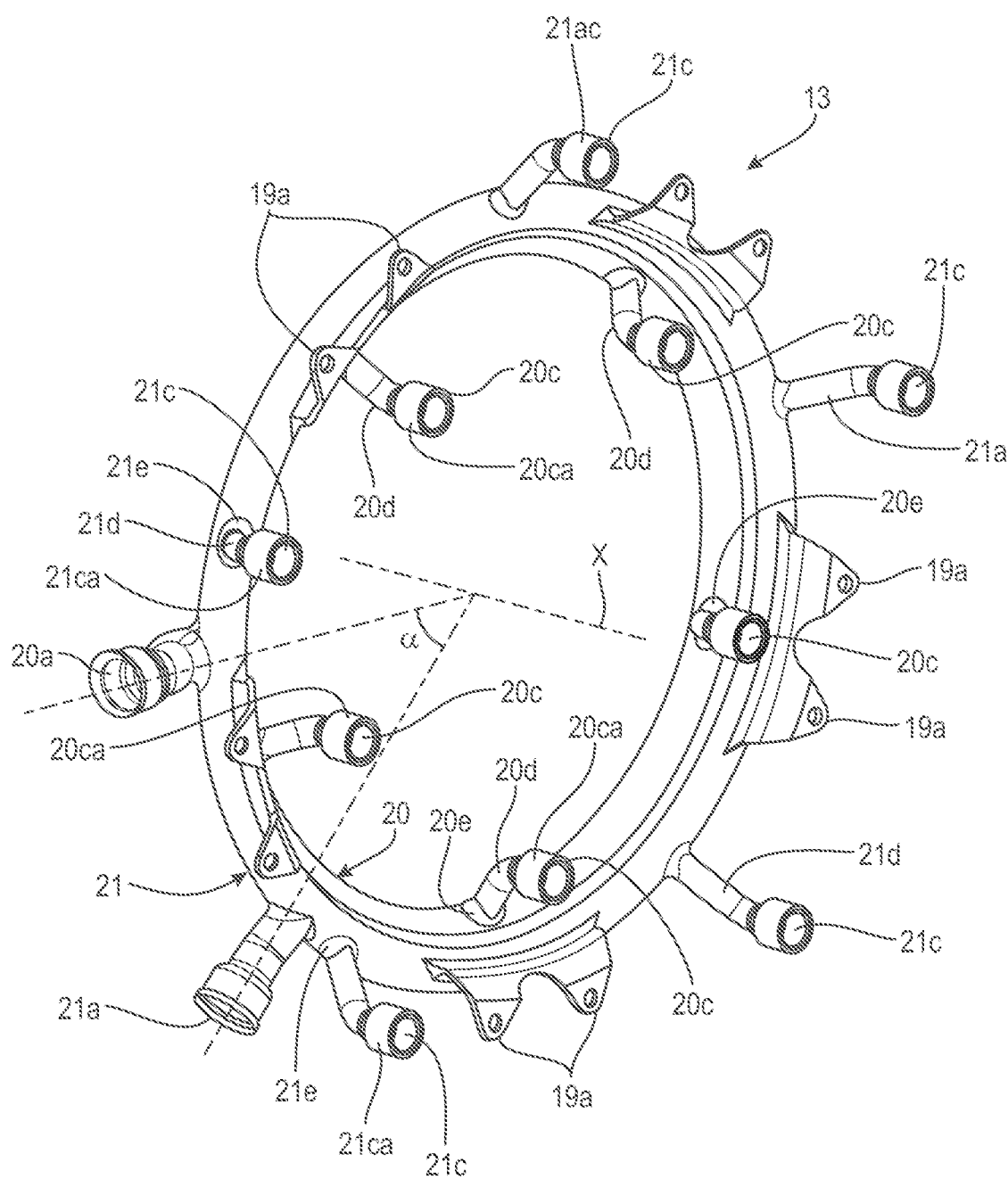
FIG. 5 is a perspective view of a lubricating oil distributor of the reduction gear of FIG. 3.

The reduction gear 6 comprises an improved lubricating oil distributor 13 which can be seen better in FIG. 5.

The distributor 13 has a general annular shape about the axis X and is formed of one single part. It is here returned and fixed on the planet-carrier 10 and comprises, for that, fixing pads 19a on the cage 14 of the planet-carrier and for example, on its rear wall 14b, as represented in FIG. 4. The pads 19a are regularly distributed about the axis X and comprise portions applied on the downstream radial face of the wall 14b and comprising orifices for the passage of screws 19b screwed in tapped holes of the wall 14b.

The distributor 13 comprises first and second independent oil circuits 20, 21, the first oil circuit 20 comprising a first oil inlet 20a connected by a first annular chamber 20b to several oil outlets 20c distributed over a first circumference C1 about the axis X, and the second oil circuit 21 comprises a second oil inlet 21a connected by a second annular chamber 21b to several oil outlets 21c distributed over a second circumference C2 about the axis X (FIGS. 3 and 5).

The circumference C1 has a diameter D1 and the circumference C2 has a diameter D2, D2 being greater than D1. The oil outlets 20c are located on D1 or C1 and the outlets 21c are located on D2 or C2. In the example represented, D1 and D2 are each greater than D3 and less than D5.

The distributor 13 is diametrically smaller than D5, which enables its mounting/dismounting without needing to touch the remainder. Due to the pins 17 and the baffles 18, the cage and the cage-carrier are mounted first, then the sun gear 7, the planet gears 8, the axes 10b and the distributor 13, as will be described in more detail below.

The outer diameter of the distributor 13 corresponds to the end of the inlets 20a, 21a (which end up with the same circumference).

The chambers 20b, 21b are formed by two coaxial and closely linked tubular rings, i.e. that their tubular walls are merged. The chambers have, in the axial cross-section, a general circular shape and the passage sections of the chambers are substantially constant over the whole of their angular extent and substantially identical to one another. Furthermore, the independence of the two oil circuits ensues due to the fact that, to the difference with single cavities, the chambers 20b and 21b are closed at their outer and inner periphery and axially upstream and downstream.

The first chamber 20b extends substantially over a circumference C4 of diameter D4 comprised between D1 and D2. The second chamber 21b extends substantially over another circumference C4' of diameter D4' comprised between D1 and D2. D4' is greater than D4. The circumferences C4 and C4' are centered on the axis X. D1 is less than D4 and D4', while D2 is greater than D4 and D4'. It is advantageous that C4 and C4' are situated substantially halfway (radial) from C1 and C2, as this rigidifies the distributor 13.

The chamber 21b of greater diameter is situated in front of that 20b of smaller diameter. As can be seen in FIG. 4, the chambers extending in the planes P2, P3 perpendicular to the axis X, which pass between the cage 14, on the one hand, and the ring 15b of the cage-carrier 15, on the other hand. It is also observed in this FIGURE, that the plane P3 which passes through the second chamber 20b or rear chamber is close to the section 3b of the LP shaft 3 and its diameter D4' is greater than that D3' of the section 3b to avoid any risk of contact when functioning.

The inlets 20a, 21a are oriented in the radial direction with respect to the axis X. They may be situated in one same plane P4 perpendicular to the axis X and are inclined one in respect to the other in this plane P4 by a determined angle α (FIGS. 5 to 7). This angle α is, for example, comprised between 30 and 60°. As can be seen in FIG. 4, the inlets 20a, 21a are oriented respectively according to the direction which each pass through one of the abovementioned space sectors S. A finger 15a of the cage-carrier passes between the two inlets 20a, 21a.

Figure 6:
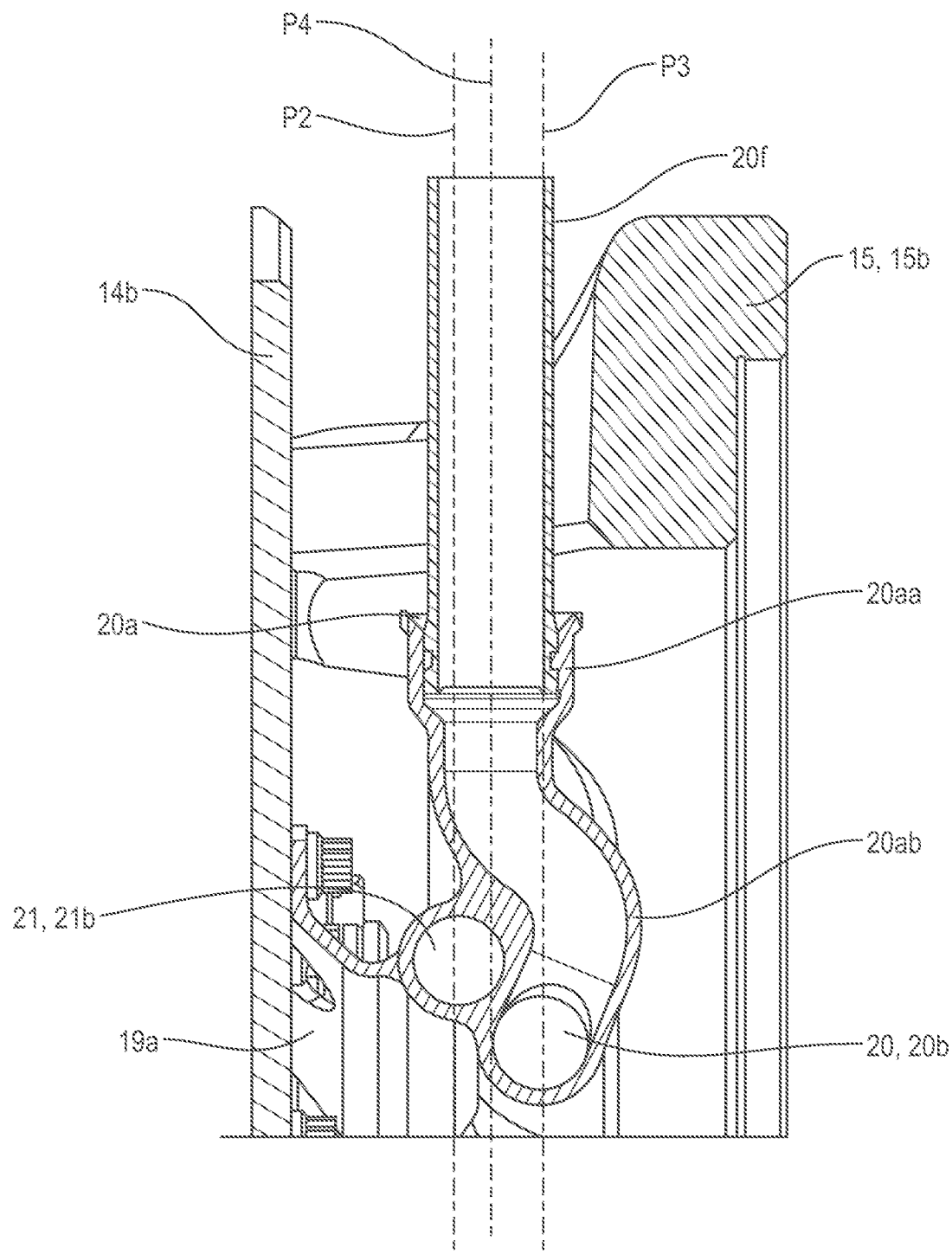
FIG. 6 is a cross-sectional view of a detail of the reduction gear of FIG. 3 and shows an oil inlet of the distributor of FIG. 5.
Figure 7:
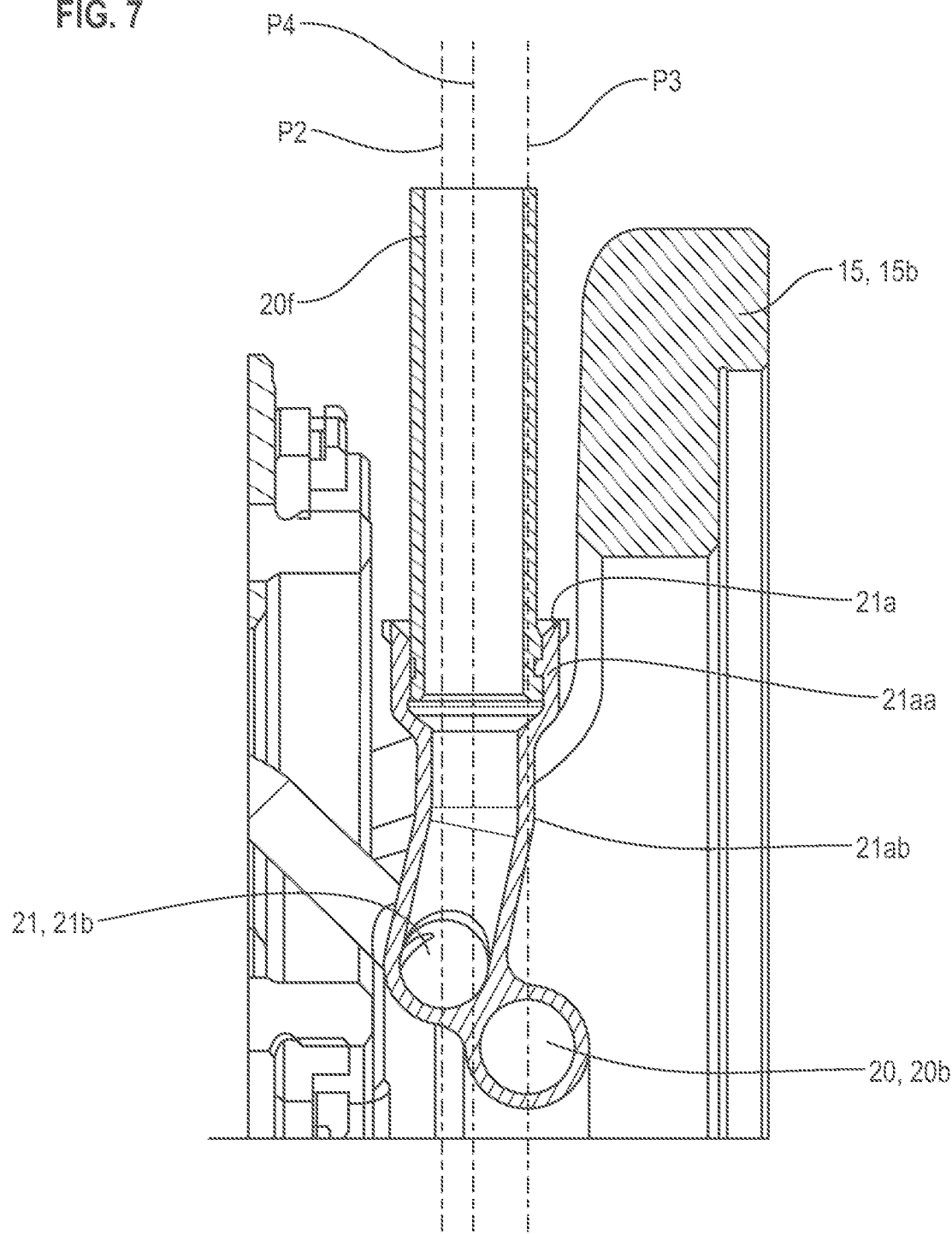
FIG. 7 is a cross-sectional view of a detail of the reduction gear of FIG. 3 and shows an oil inlet of the distributor of FIG. 5.

The planes P2, P3 and P4 are situated between the cage 14 and the ring 15b of the cage-carrier 15 (FIGS. 6 and 7).

The distributor 13 is advantageously configured to be fluidically connected, at the level of its inlets and of these outlets, by male-female type press-fittings, i.e. by connectors interlocking by axial translation of a male connector in a female connector. Even if a connector is presented below as male and configured to co-operate with a female connector, it can, in a variant, be replaced by a female connector configured therefore to co-operate with a male connector, and vice versa.

Concerning the inlets 20a, 21a, they each comprise a female connector 20aa, 21aa in the example represented which is configured to receive the male connector of a supply pipe 20f, 21f (FIGS. 4, 6 and 7). The pipes 20f, 21f are rectilinear and pass through the abovementioned space sectors S and are configured to also pass through tubular arms of an intermediate casing of the turbine engine 1, in view of the connection of the distributor 13 to a lubricating oil source. The number of arms of the intermediate casing can be greater than 5 and therefore than the number of space sectors S. The sealing of the male-female connectors can be ensured by O-rings or similar.

The female connectors 20aa, 21aa of the inlets 20a, 21a are connected to the respective chambers by pipes 20d, 21d. The connector 20aa of the inlet 20a is connected to the chamber 20b the farthest away from the plane P4 by a pipe 20ab which has a general S shape (FIG. 6). The connector 21aa of the inlet 21a is connected to the chamber 21b the closest to the plane P4 by a pipe 21ab which has a rectilinear or slightly bent shape (FIG. 7).

Concerning the outlets 20c, they each comprise a female connector 20ca in the example represented, which is configured to receive the male connector of one of the baffles 18. These outlets 20c are oriented axially, all in the same direction here to the front. The connectors 20ca of these outlets are connected to the chamber 20b by substantially L-shaped or V-shaped channels 20d (FIG. 5).

Concerning the outlets 21c, they each comprise a female connector 21ca in the example represented, which is configured to receive the male connector of one of the lubricating and cooling hubs 22 which will be described in detail below, in reference to FIGS. 8 to 13. These outlets 21c are oriented axially, all in the same direction, here to the front. The connectors 21ca of these outlets are connected to the chamber 21b by substantially L-shaped or V-shaped conduits 21d.

As can be seen in FIG. 3, the axial lengths or dimensions of the channels 20d and of the conduits 21d are different, the outlets 21c being situated in a plane P5 perpendicular to the axis X which is more forward than that P6 which passes through the outlets 20c. The planes P5 and P6 are situated in the cage 14.

Finally, as can be seen in FIG. 5, the channels 20d are connected to the ring forming the chamber 20b by T-lines 20e situated on the inner periphery of this ring, while the conduits 21d are connected to the ring forming the chamber 21b by T-lines 21e situated on the outer periphery of this ring (FIG. 5).

As mentioned above, the outlets 21c of the distributor 13 are connected to hubs 22 which will now be described in reference to FIGS. 8 to 13.

The hubs 22 have for function to lubricate and cool the axes 10b of the planet gears 8 which are here centered and guided by the bearings 11 with rollers 11a.

In the embodiment examples represented, each axis 10b is guided by a double roller bearing 11, i.e. a double roller row bearing 11a. The two rows extend about one same axis which is combined with that, referenced Y, of the axis 10b of the planet gear 8.

Conventionally, the rollers are guided in tracks defined by inner and outer rings. In the examples represented, a particularity is linked to the fact that the inner guiding rings of the rollers 11a are integrated to the axis 10b. The outer periphery of the axis 10b thus comprises cylindrical roller tracks 11b of the rollers 11a, each track 11b being delimited axially by annular ridges 11c which serve them for the guiding of cages 11d for maintaining rollers 11a. Moreover, FIG. 3 makes it possible to see that the outer rings are integrated at the inner periphery of the planet gears 8. The inner periphery of the planet gears 8 thus comprises cylindrical roller tracks 8a of the rollers 11a, the tracks 8a being separated from one another by an annular groove 8b opening radially inwards and to the bottom of which are formed radial bores 8c for the passage of oil.

The outer periphery of each planet gear 8 comprises a double propeller gearing 8d, i.e. two coaxial and adjacent propellers which are here separated from one another by an annular groove 8e opening radially outwards and to the bottom of which the bores 8c open.

The inner periphery of the axis 10b of each planet gear 8 has a general biconical shape and comprises two inner truncated surfaces 10e, 10f flared in opposite, axial directions. The front, inner truncated surface 10e is thus flared frontwards and the rear, inner truncated surface 10f is flared rearwards. In the example represented, a cylindrical surface 10g is situated between the truncated surfaces 10e, 10f, a front, inner cylindrical surface 10h extends between the front end of the axis 10b and the front end of the surface 10e, and a rear, inner cylindrical surface 10i extends between the rear end of the axis 10b and the rear end of this axis 10b.

Orifices 10d for the passage of oil pass through the axes 10b in the radial direction, and therefore extend between their inner and outer peripheries. In the example represented, they extend between the truncated surfaces 10e, 10f, on the one hand, and the tracks 11b and the outer peripheries of the ridges 11c, on the other hand.

An annular flange 10ga for fixing the hub 22 extends radially inwards from the cylindrical surface 10g. This flange 10ga comprises axial orifices for the passage of screws 30.

In the first embodiment of the hub 22 represented in FIGS. 8 to 11, this hub 22 comprises two coaxial and substantially truncated annular plates 22a, 22b, each comprising a first end of a greater diameter and second opposite end, with a smaller diameter. The plates, respectively front 22a and rear 22b, are fixed together by their second ends. Like the surfaces 10e, 10f, the plates 22a, 22b are thus flared in opposite axial directions.

The plates 22a, 22b are mounted adjusted inside the axis 10b and are configured to cover the truncated surfaces 10e, 10f to define with them, at least one annular cavity 24 for the circulation of lubricating and cooling oil of the axis 10b. In the example represented, there are two of these cavities 24 which are separated from one another by the flange 10ga.

The ends of the plates 22a, 22b each comprise an outer cylindrical centering surface comprising an annular recess for receiving a seal 25a. The front plate 22a comprises an upstream end mounted adjusted by its outer cylindrical surface on the surface 10h, and a downstream end mounted adjusted by its outer cylindrical surface on the surface 10g, in front of the flange 10ga. The rear plate 22b comprises an upstream end mounted adjusted by its outer cylindrical surface on the surface 10h, behind the flange 10ga, and a downstream end mounted adjusted by its outer cylindrical surface on the surface 10i.

Figure 8:
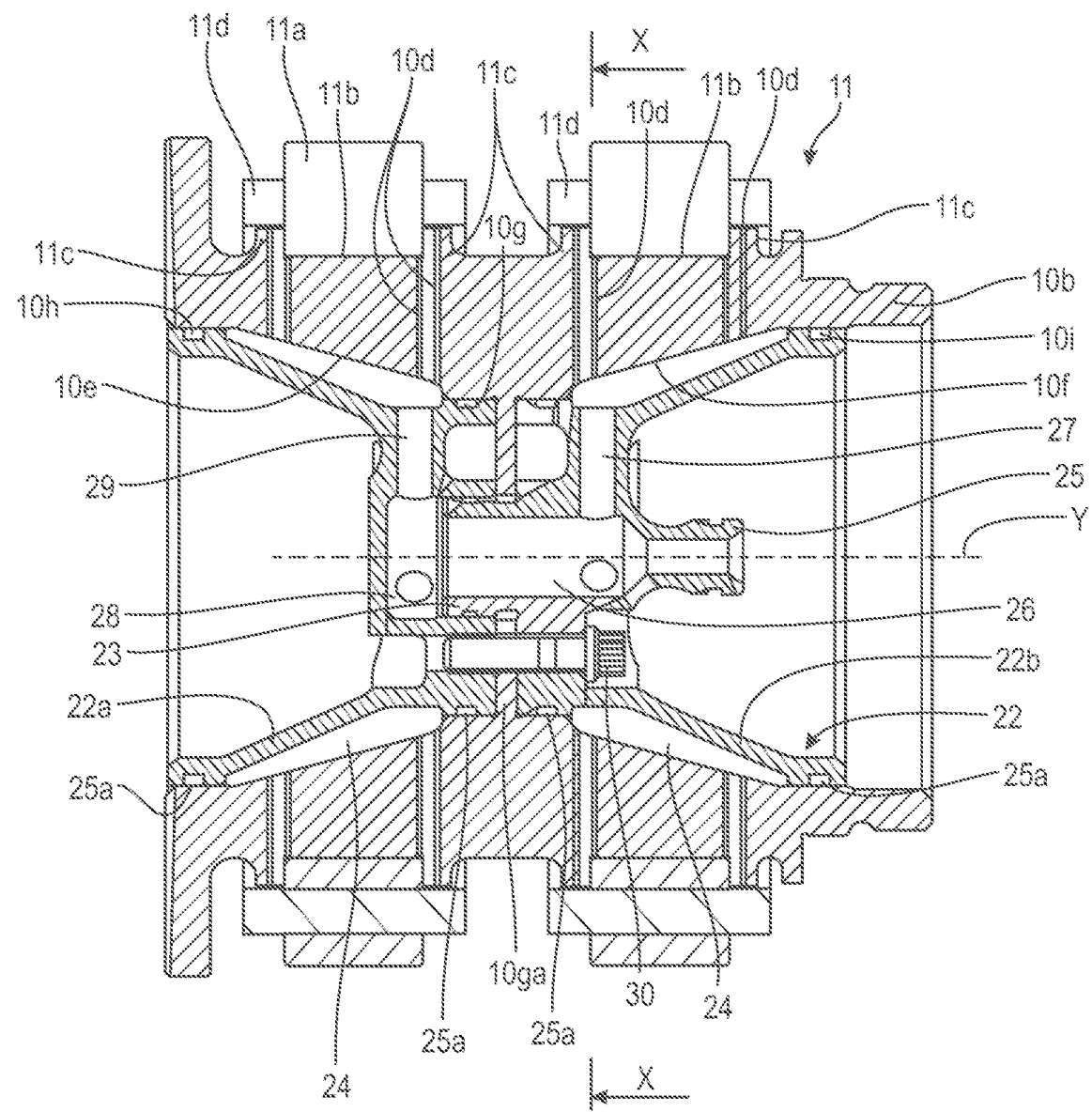
FIG. 8 is a cross-sectional view of a detail of FIG. 3 and shows a planet gear axis, wherein a lubricating and cooling hub is mounted.
Figure 9:
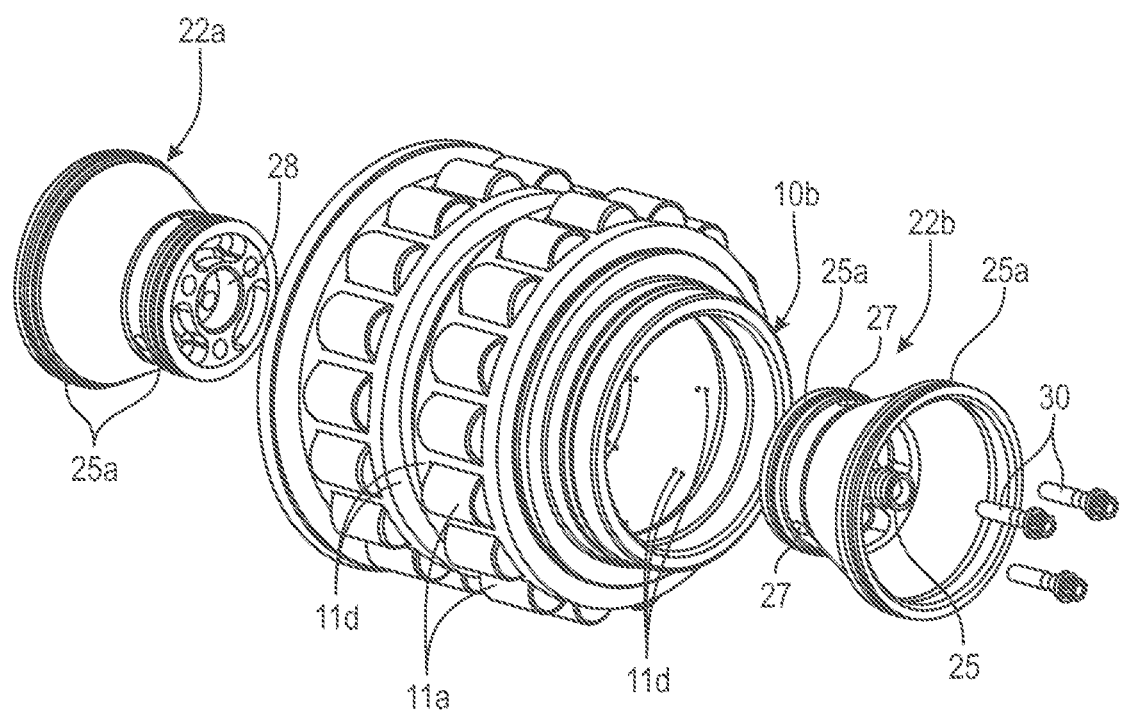
FIG. 9 is an exploded perspective view of the axis and of the hub of FIG. 8.

It is observed in FIG. 8, that the orifices 10d open radially inside into the cavities 24. It is also observed, that the plates 22a, 22b comprise means for fluidically connecting the cavities 24 to the distributor 13 described above.

The rear plate 22b here comprises an inner chamber 26 centered on the axis Y and connected, on the one hand, by radial passage 27 formed in this plate to the cavity 24 delimited by this plate and the surface 10f. This plate 22b further comprises a connecting pipe 25 centered on the axis Y, of which one end opens into the chamber 26 and whose opposite end oriented rearwards forms a male connector configured to receive by press-fitting one of the female connectors 21ca of an outlet 21c of the distributor 13. In a variant, the pipe 25 could form a female connector.

The rear plate 22b is mounted adjusted in the axis 10b by axial translation from the rear up to its front end, that is axially bearing on the flange 10ga. The plate 22b comprises at its front end, another connecting pipe 23 centered on the axis Y, which defines a front end portion of the chamber 26 and which is configured to pass axially through the flange 10ga, in its middle, in view of the connection of the chamber 26 to an inner chamber 28 of the front plate 22a. The chamber 26 thus extends between the pipe 25 and the chamber 28, the latter being connected to the cavity 24 formed between the plate 22a and the surface 10e by bores 29 formed in this plate.

Figure 10:
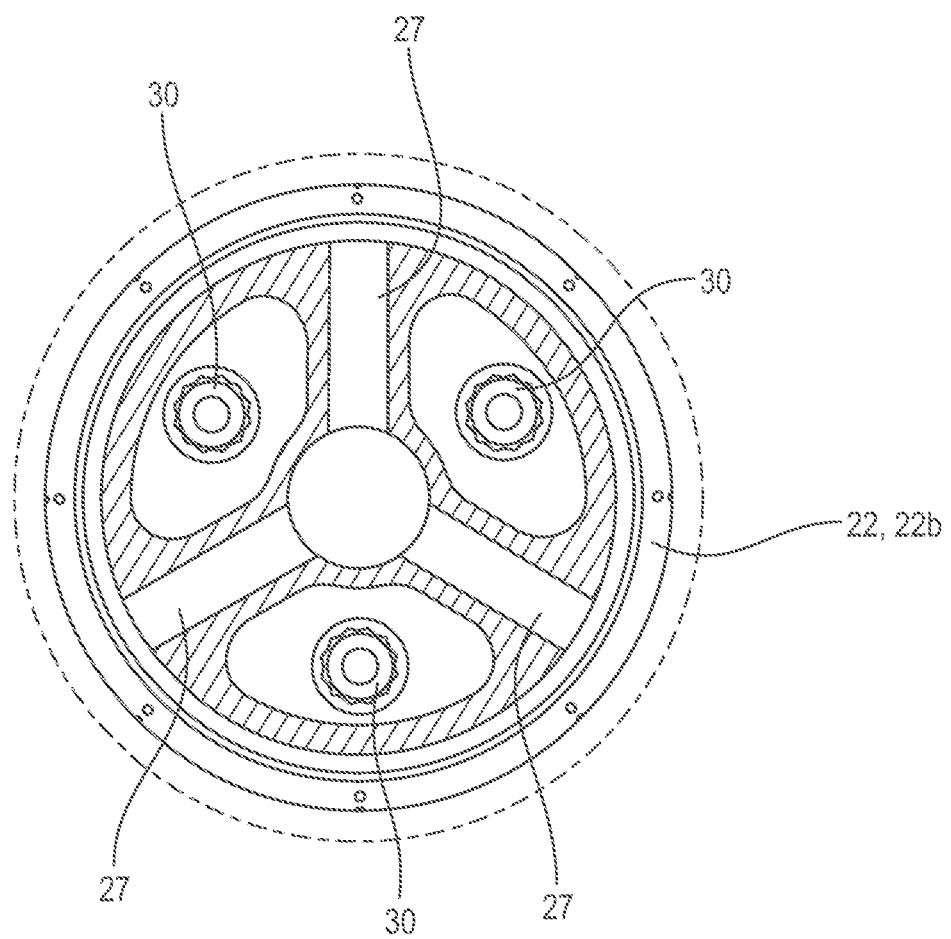
FIG. 10 is a cross-sectional view along the line X-X of FIG. 8.

There are three bores 27, 29 of each plate 22a, 22b (this number can vary between one and more), and regularly distributed about the axis Y (FIG. 10). In the example, they are of the same number of fixing screws. The number mainly depends on the radial place whether it remains after or before the installation of screws. The plates 22a, 22b further comprise each of the orifices for the passage or screwing of fixing screws 30 together and to the flange 10ga. The orifices of the plates are aligned together and to those of the flange 10ga and the screws 30 are screwed from the rear through, in order, an orifice of the plate 22b, an aligned orifice of the flange 10ga and an orifice of the plate 22a (see FIG. 8).

Figure 11:
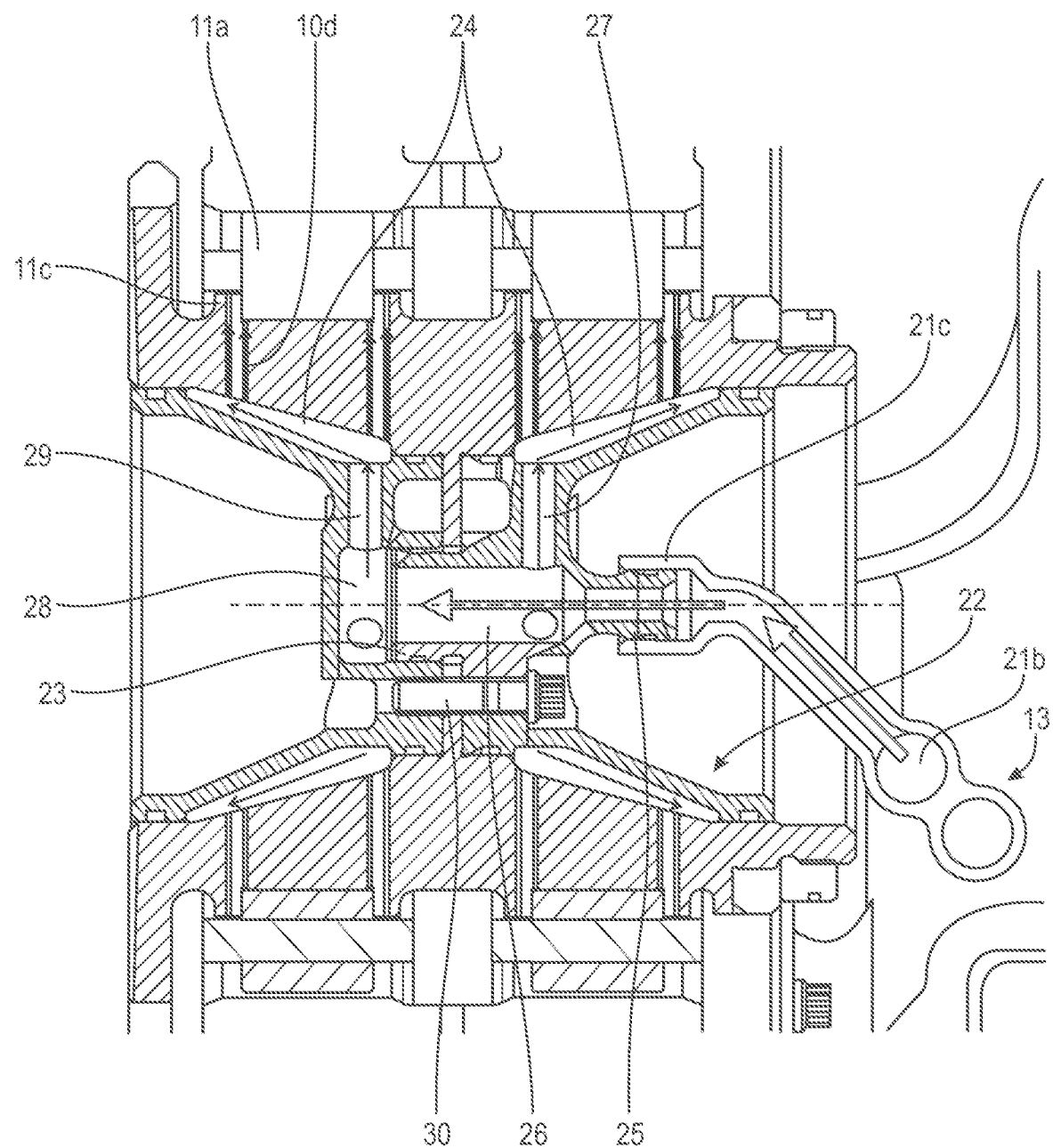
FIG. 11 is a similar view to that of FIG. 8 and shows the movement of lubricating and cooling oil.

FIG. 11 shows the conveyance of the oil from the distributor 13 to the rollers 11a and to the cage 11d, in view of the lubrication of the rollers and of the cage, but also the cooling of the axis 10b. The oil enters into the distributor 13 through its inlet 21a and supplies the chamber 21b then circulates to the outlets 21c. The oil enters into the chamber 26 through the pipe 25 then into the chamber 28 through the pipe 23. The chambers 26 and 28 make it possible to slow down the oil flow (and to avoid a Venturi effect to the right of the bores 27, 29) and to distribute the oil better between the front and rear plates. The oil then circulates in the bores 27, 29 to supply the cavities 24. The oil flows axially along the surfaces, from the rear upstream over the surface 10e, due to the fact that the bores 29 open to the rear end of the front cavity 24, and from the front rearwards over the surface 10f, due to the fact that the bores 27 open to the front end of the rear cavity 24. The oil then circulates in the orifices 10d to reach the tracks 11b and the ridges 11c in view of the lubrication of the rollers 11a and of the cages 11d. The oil is brought "cold" by the distributor 13. It circulates in the axis 10b which is hot and is therefore heated. It thus arrives at a good temperature for an optimal lubrication efficiency at the level of the bearing, while having evacuated the heat generated. The quantity of heat taken by the oil depends, for example, on the shape of the plates 22a, 22b.

The thickness or the radial dimension of the cavity 24 is chosen according to the increase of the expected temperature of the oil configured to circulate in this cavity, for example between 10° C. and 60° C. The temperature of the oil at the outlet of the orifices 10d also depends on the tilt angle of the truncated surfaces 10e, 10f and of the plates 22a, 22b, with respect to the axis Y.

Figure 12:
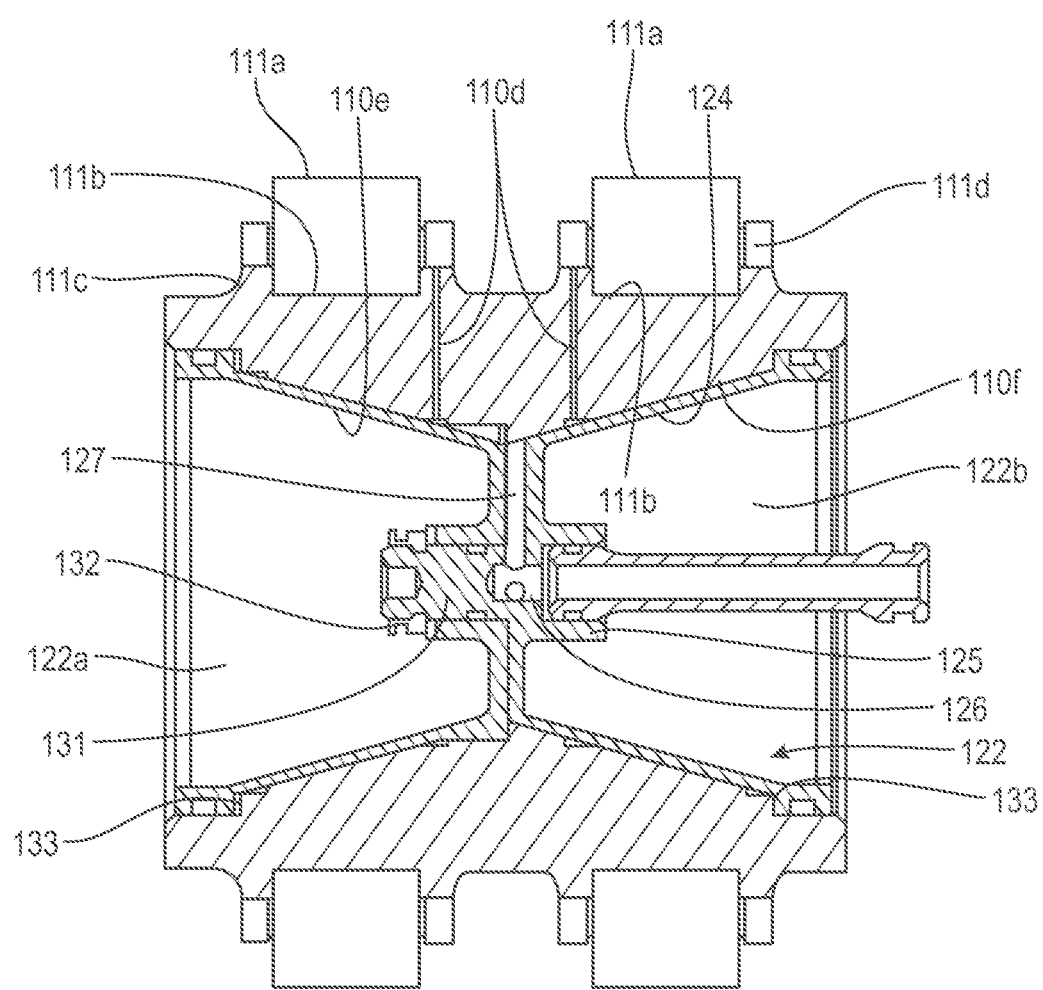
FIG. 12 is a view, similar to that of FIG. 8 and illustrating an embodiment variant of the hub.
Figure 13:
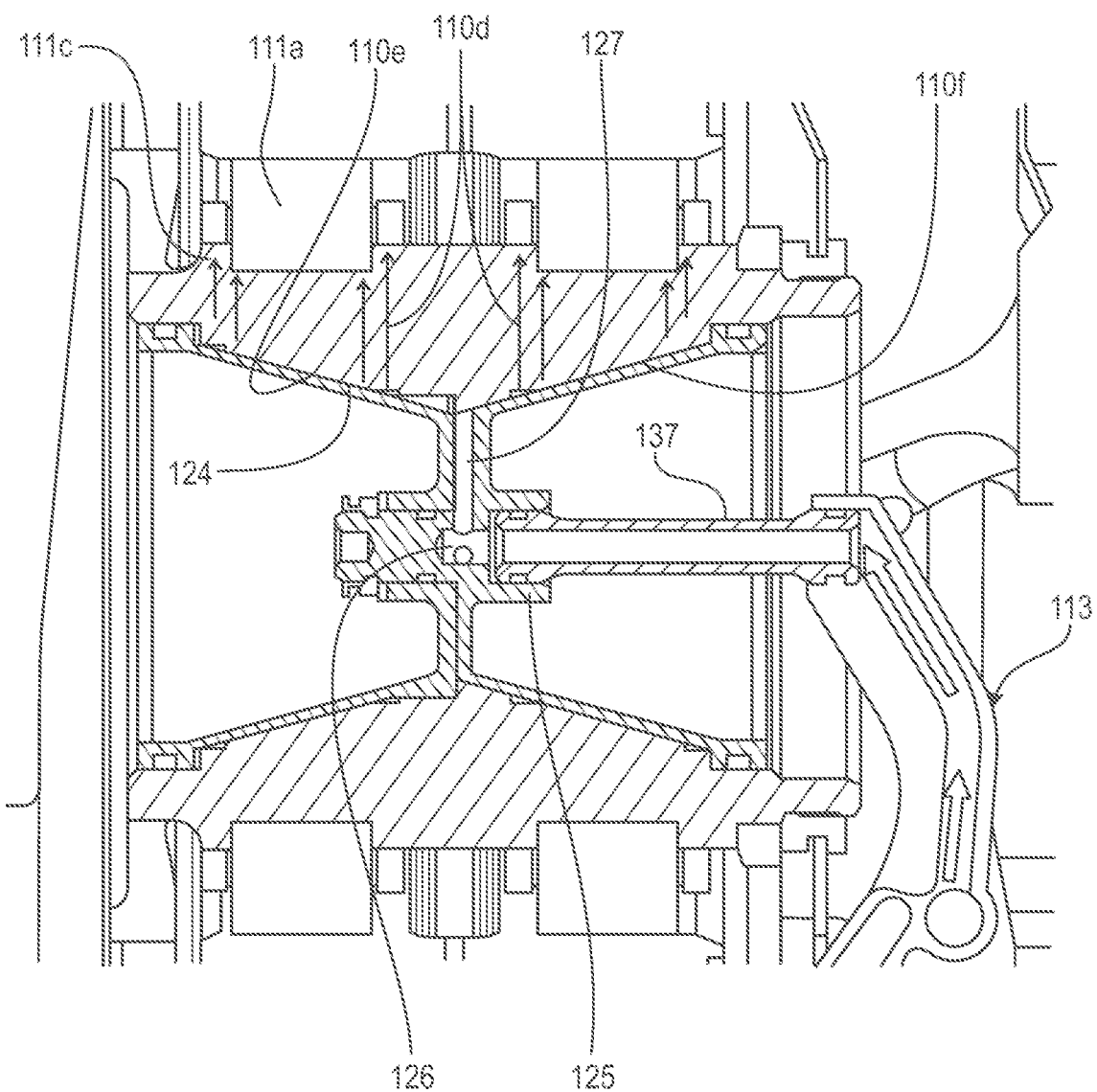
FIG. 13 is a view, similar to that of FIG. 12 and shows the movement of lubricating and cooling oil.

FIGS. 12 and 13 represent an embodiment variant of the hub which is designated by the reference 122. Its features are designated by the same reference figures as those of the hub 22, increased by one hundred. The description above in relation to the hub 22 is applied to this variant insofar as it does not contradict the following.

The hub 122 differs from the preceding embodiment, for example, in that the plates 122a, 122b define one single annular cavity 124 with the inner periphery of the axis 110b. This axis 110b does not comprise here, any inner cylindrical surface between its truncated surfaces 110e, 110f. The ends of the smallest diameters of the truncated surfaces 110e, 110f are thus directly connected together. The inner periphery of the axis 110b does not comprise any flange 10ga of the abovementioned type. The cavity 124 has a general "diabolo" shape. It can also be observed, that the radial thickness of this cavity 124 is less than that in the preceding embodiment. The orifices 110d for the passage of oil are distributed in annular rows and each row of orifices opens into the cavity 124, in the bottom of a radially inner annular groove formed on the surface 110e, 110f.

The chamber 126 of the rear plate 122b is in fluidic communication with the pipe 125 and with radial bores 127 which open into the cavity 124. This chamber 126 is here closed at its front end. The chamber 126 is therefore formed in the rear plate 122b (e.g., only in the rear plate). The bores 127 can also be formed in the rear plate 122b (e.g., only in the rear plate) or formed in this plate 122b and closed axially by the front plate 122a.

The rear plate 122b comprises a central cylindrical extension 131 frontwards which comprises an outer threading and which passes through a central orifice of the front plate 122a. This extension 131 receives a nut 132 screwed from the front which bears axially on the front plate, in view of the clamping of the assembly. Due to the absence of the flange 10ga of the preceding embodiment, the plates 122a, 122b are fixed to one another (e.g., only to one another) and are maintained in position inside the axis 110b by the single adjusted mounting of the plates on the inner periphery of the axis 110b. The clamping of the nut 132 generates an axial clamping of the inner periphery of the axis 110b between the plates 122a, 122b due to the complementarity of shapes.

As can be seen in the drawings, the largest ends of the plates can furthermore be clamped axially against cylindrical shoulders 133 of the inner periphery of the axis 110b, during the clamping of the nut 132.

FIG. 13 shows the conveyance of the oil from the distributor 113 to the rollers 111a, in view of lubricating the rollers, but also the cooling of the axis 110b. The oil enters into the distributor 113 as indicated above, then enters into the chamber 126 through a socket 137 engaged in the pipe 125. The socket 137 is a similar connecting socket to the sockets 37 and of which the length is adjusted according to need. The number of sockets 137 is equal to the number of pipes 21d and makes it possible to correct the misalignment and to have a less statically indeterminate mounting of the distributor 113 on the reduction gear. The oil then circulates in the bores 127 to supply the cavity 124, substantially in its middle. The oil flows axially along the surfaces 110e, 110f, from the centre of the cavity to the rear and to the front. The oil then circulates in the orifices 110d to reach the tracks 111b and the ridges 111c in view of lubricating the rollers 111a and the cage 111d.

FIGS. 14 to 17 illustrate an embodiment of a baffle 18. As mentioned above, the reduction gear 6 comprises several baffles 18 which are housed in the cage 14 and are each arranged between two adjacent planet gears 8. The number of baffles 18 of the reduction gear 6 is therefore equal to the number of planet gears 8 of this reduction gear.

The first function of a baffle 18 is to guide the lubricating oil of the gearings of the planet gears 8 and to avoid the recirculation of oil between planet gears, hence the notion of "inter-planet gear baffle". The baffles 18 are thus shaped to fit the peripheral shape of the planet gears 8.

Figure 15:
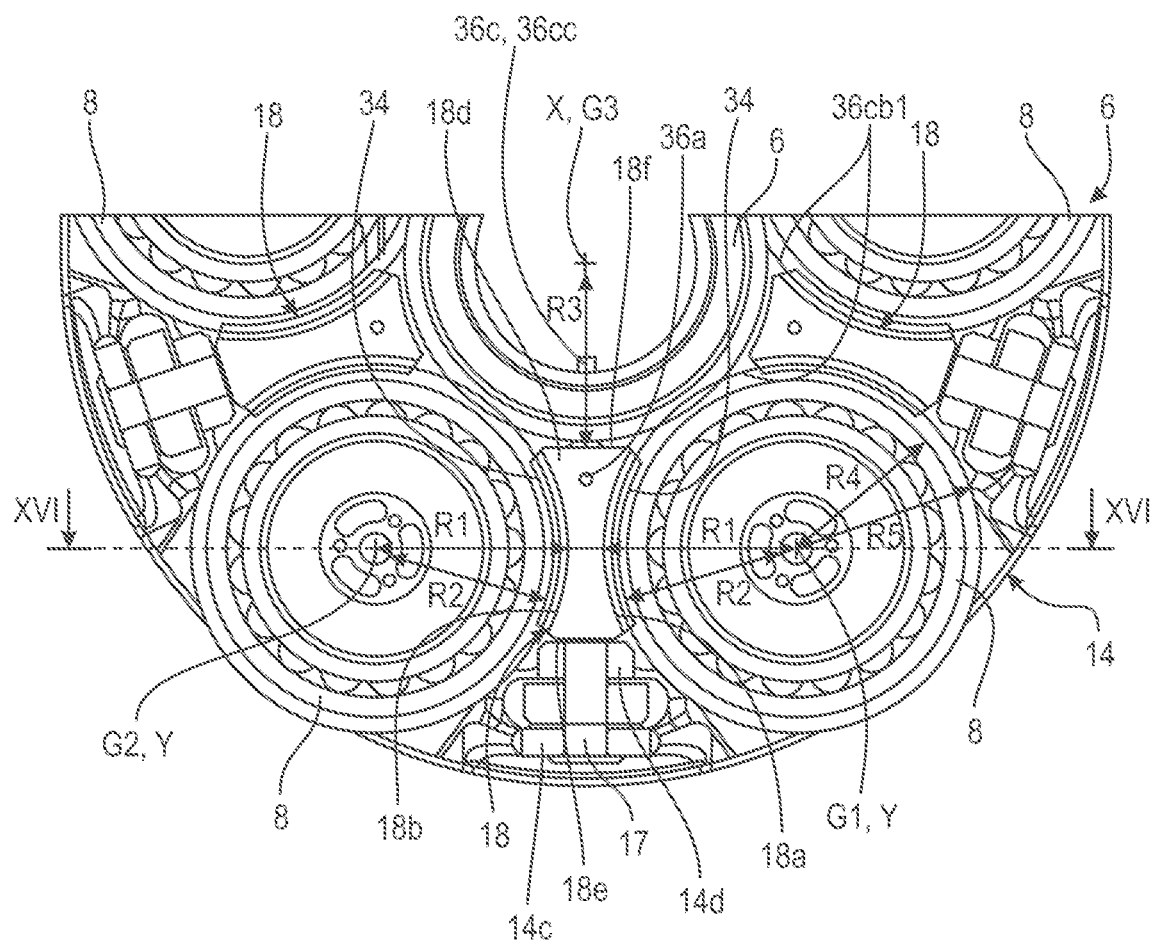
FIG. 15 is a partial, radial, cross-sectional view of the reduction gear of FIG. 3 and shows the position of the baffle of FIG. 14 in this reduction gear.

As can be seen in FIGS. 4 and 15, in addition to extending between two adjacent planet gears 8, each baffle 18 is situated between the sun gear 7 on the one hand, situated radially inwards, and a pair of staples 14c, 14d, on the other hand, situated radially outwards.

Each baffle 18 comprises a block comprising a first lateral surface 18a which is cylindrical and concave and which has a bend radius R1 measured from an axis G1, which is coincident with the axis Y of rotation of a planet gear 8 (FIG. 15). The block comprises a second lateral surface 18b, opposite the first surface 18a, which is cylindrical and concave and which has a bend radius R1 measured from an axis G2 which is parallel to G1, and which is combined with the axis Y of rotation of another planet gear 8.

Each of the first and second surfaces 18a, 18b comprises a protruding strip 34 which has a general extended shape about the axis G1, G2 of the surface considered and whose inner periphery is concave-curved and has a bend radius R2 measured from this axis G1, G2 which is less than R1. The strips 34 of a baffle 18 extend substantially in one same plane, perpendicular to the axis X and may be situated in the middle of the respective surfaces 18a, 18b (in the axial direction).

The surfaces 18a, 18b and the strips 34 extend about the respective axes G1, G2 over an angular range of between 30 and 80° in this example, and may be as large as possible.

In the example represented and as can be seen in FIGS. 14 and 15, the longitudinal ends of the strips 34 are recessed with respect to the planes passing respectively through the faces 18e, 18f of the baffle 18.

Figure 14A:
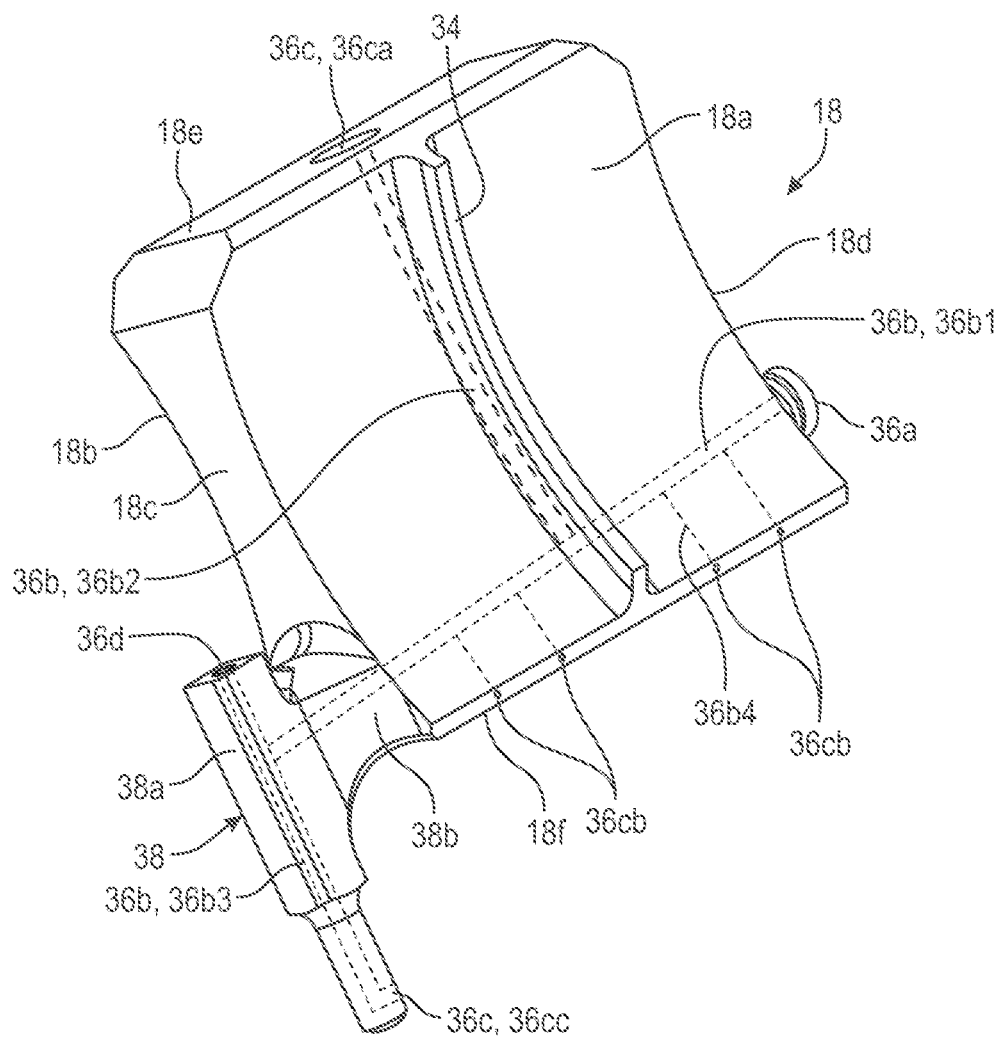
FIG. 14a is a perspective view of a baffle.
Figure 14B:
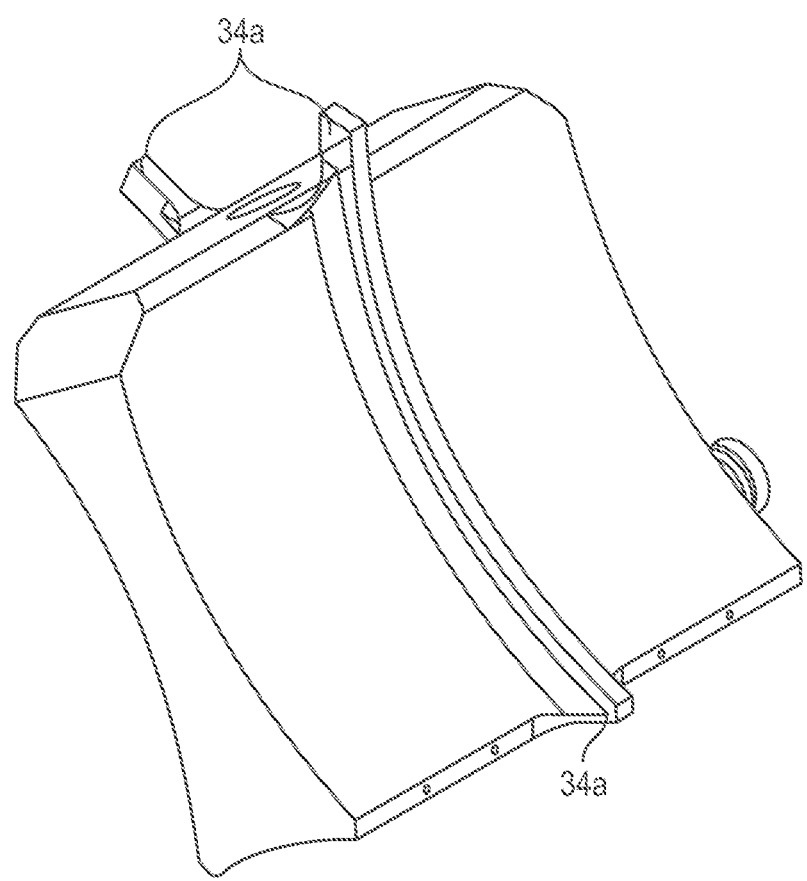
FIG. 14b is a view, similar to that of FIG. 14a and illustrating an embodiment variant of a baffle.

In the variant represented in FIG. 23, the longitudinal ends 34a of the strips 34 could pass through such planes and thus protrude with the aim, for example, of extending the length of the strips and therefore the circumferential dimension for guiding the oil around the planet gear 8. In the latter case, the strip 34 would exceed the side of the face 18f where the jets 36cb are located (sun gear side) and the other on the side of the staples 14c, 14d and of the finger 15a. On the solution of FIGS. 14a and 15, the strip covers around 2×45° of the circumference of a planet gear (twice, as there are two baffles on either side). If the strip is extended as can be seen in FIG. 14b, outside of the baffle such that it does not touch the sun gear upon mounting and that it does not exit the circumference of the cage, the strip could cover around 2×75° of coverage over 360° of the planet gear.

The block of each baffle 18 further comprises a front flat face 18c, which is substantially radial when the baffle is mounted in the cage 14 of the reduction gear, and a rear flat face 18d, which is also substantially radial. The block further comprises an upper flat face 18e (or radially outer), which is configured to be oriented on the side of the pair of staples 14c, 14d, and a lower face 18f (or radially inner), which is configured to be oriented on the side of the sun gear 7. This face 18f is cylindrical and concave and has a bend radius R3 measured from an axis G3, which is combined with the axis X of the sun gear. This face 18f therefore has the function of guiding the lubricating oil of the gearing of the sun gear.

The baffles 18 extend between the radial walls 14a, 14b of the cage 14 and have their faces 18a, 18b, which bear on the inner faces facing these walls 14a, 14b. The baffles 18 are fixed to the cage 14 by screws 35, for example. Each block can comprise, for example, on their rear face 18d, tapped holes for receiving screws 35 for fixing the baffle to the rear wall 14b of the cage 14. An identical configuration on the wall 14a is also possible.

As can be seen in FIG. 4, the tapped holes of each baffle 18 are situated substantially at the middle of the height or radial dimension of the baffle, and the screws 35 screwed in these holes pass through the orifices of the wall 14b which are situated in the proximity of the radially inner peripheral edge 14ba of this wall 14b (FIGS. 3 and 4). It is thus understood, that in the mounted position, each baffle 18 has a lower portion which extends radially inwards from the peripheral edge 14ba, between this peripheral edge 14ba and the sun gear 7.

Figure 16:
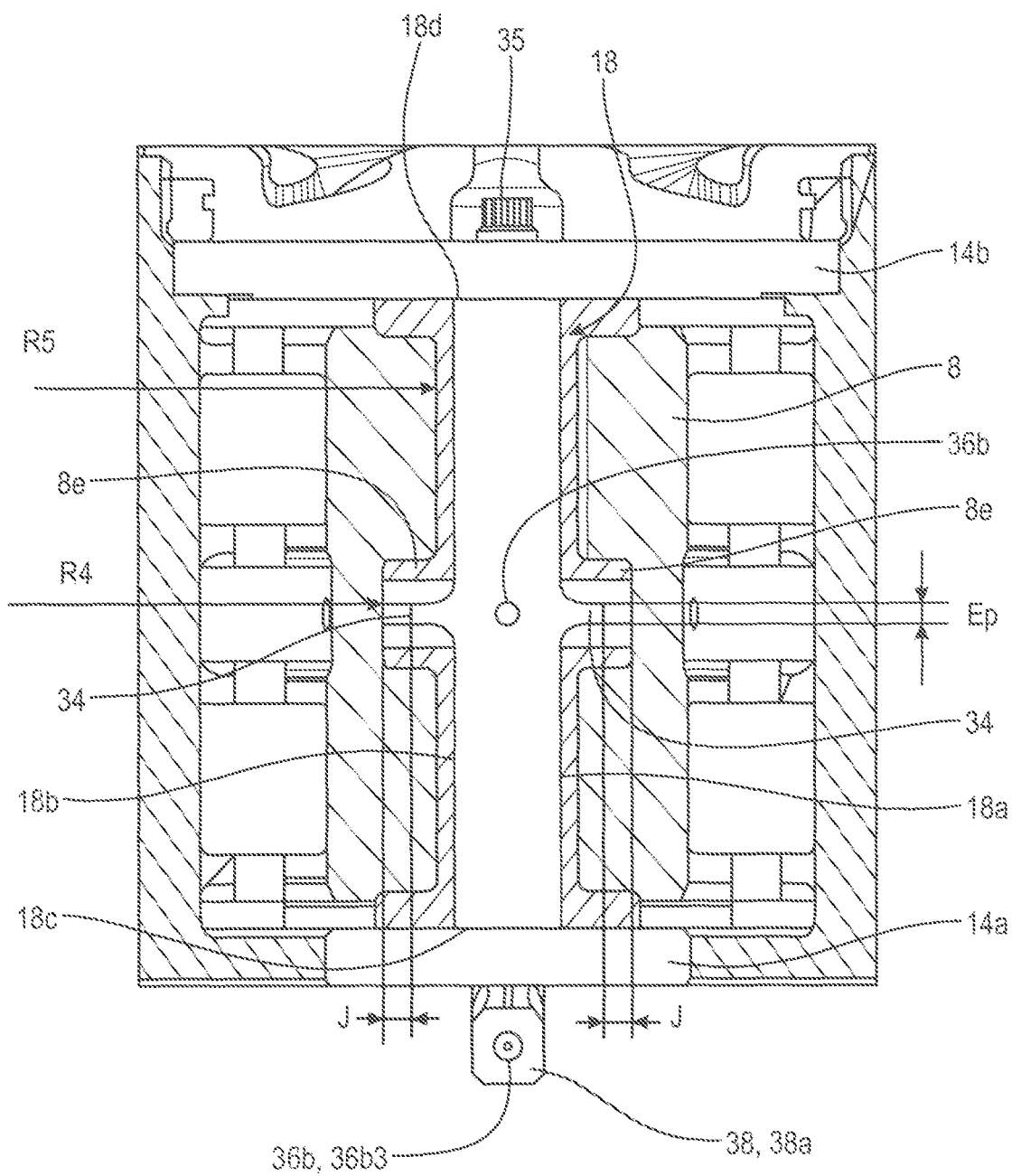
FIG. 16 is a cross-sectional view along the line XVI-XVI of FIG. 15.

It is furthermore observed in FIG. 16, that in the mounted position, the strips 34 of each baffle 18 extend to the middle and inside the inter-propeller grooves 8e of the two planet gears 8 between which this baffle is mounted. A predetermined clearance J is left between the top of each strip 34 and the bottom facing the groove 8e, wherein the strip is inserted. The strip 34 has a thickness Ep or axial dimension which represents around 10 to 90% of the axial dimension of the groove 8e. The groove 8e of a planet gear has a radius R4 measured from the axis Y of the planet gear and its gearing has an outer radius R5 measured from the same axis. The radius R2 is between R4 and R5 and the abovementioned clearance J is equal to the difference between R2 and R4 (FIGS. 15 and 16). This clearance J may be as small as possible to optimise the function of the "inter-propeller baffle" strip 34. The strips 34 have for function to limit the passage of oil of a gearing to another gearing of one same planet gear 8.

Each baffle 18 comprises an integrated lubricating circuit, which comprises an oil inlet 36a connected by bores 36b to at least one oil outlet 36c. In the example represented, the oil inlet 36a is situated on the rear face 18d and comprises a pipe configured to form a male connector and to co-operate by male-female press-fitting with an outlet 20c of the distributor 13 described above. Even if a connector is presented above as male and configured to co-operate with a female connector, it can, in a variant, be replaced by a female connector configured therefore to co-operate with a male connector, and vice versa (FIG. 3).

Each baffle 18 comprises at least one outlet 36c which is presented in the form of an orifice 36ca forming a female connector which is configured to receive a sealed fluidic connection socket 37 (FIG. 3). Like the inlet 36a, the socket 37 can be removed and replaced by a male connector. This orifice 36ca is here situated on the upper face 18e of each baffle. FIG. 3 makes it possible to see that one half of the socket 37 is engaged by male-female press-fitting in the orifice 36ca and that the other half is engaged by male-female press-fitting in a female orifice provided at the radially inner end of the body 17a of the pin 17 carried by a pair of staples 14c, 14d. This same figure shows that the inlet 36a is connected by two bores 36b1, 36b2 to the outlet 36c. These bores are perpendicular, a first 36b1 extending about the axis X, from the inlet 36a, and a second 36b2 extending radially from the first bore to the orifice 36ca.

The surfaces 18a, 18b are each connected to the face 18f by a truncated edge on which are formed orifices 36cb of oil projection over the meshing zones of the sun gear 7 with the planet gears 8. These orifices 36cb are connected by inner channels 36b4 to the block, to the axial bore 36b1 (FIGS. 3 and 14). FIG. 15 shows the paths 36cb1 of the oil jets projected by the orifices 36cb of a baffle 18.

One of the baffles 18 comprises a nozzle 38 configured to project the lubricating oil over the slots 7a of the sun gear 7. This baffle 18 is that represented in FIG. 14 and at the centre in FIG. 15. The nozzle 38 is formed of one single part with the block of the baffle 18 and here has a general L shape whose one branch 38a has a radial orientation and of which one branch 38b extends axially and connects the front face 18c of the block to the radially outer end of the branch 38a. The nozzle 38 extends in a median plane of symmetry of the block. The baffles 18 which do not comprise any nozzle 38 also has a median plane of symmetry, which corresponds to a plane passing through the axis X of the reduction gear 6.

Figure 17:
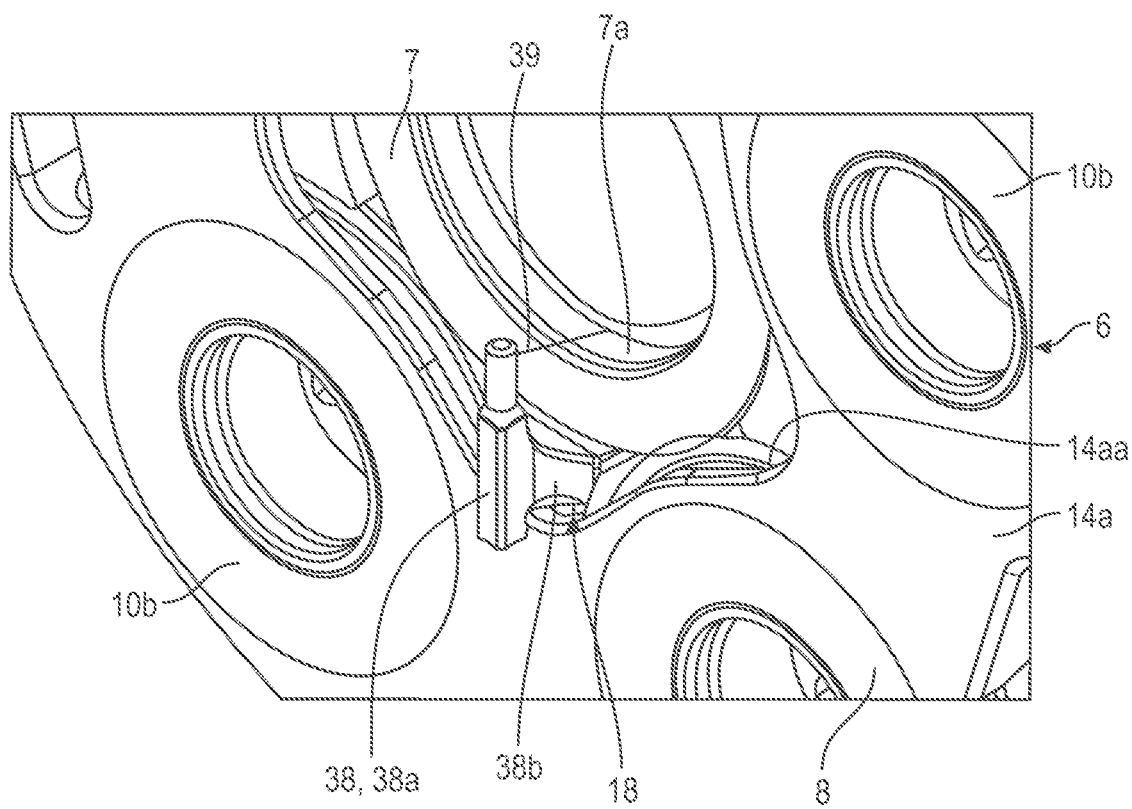
FIG. 17 is a partial, perspective view of a front face of the reduction gear of FIG. 3.

The branch 38a extends radially inwards from the branch 38b and its radially inner free end comprises an orifice 36cc oriented rearwards for the projection of oil over the slots 7a. FIG. 17 shows the oil jet 39 projected by this nozzle 38.

The oil supply from the nozzle 38 is produced by extending the axial bore 36b1 which can be seen in FIG. 3 to the front face 18c of the block of the baffle 18, and in the axial branch 38b (FIG. 14). An additional radial bore 36b3 is produced in the branch 38 to connect this axial bore 36b to the orifice 36cc for projecting oil from the nozzle. The radially outer end of the bore 36b3 of the nozzle, which is therefore opposite the orifice 36cc for projecting oil, can be closed by a returned stopper 36d (FIG. 14). As can be seen in FIG. 3, the baffles 18 which do not comprise any nozzle 38 have a shorter axial bore 36b, i.e. not opening onto the front face 18c of the block of the baffle.

Figure 18:
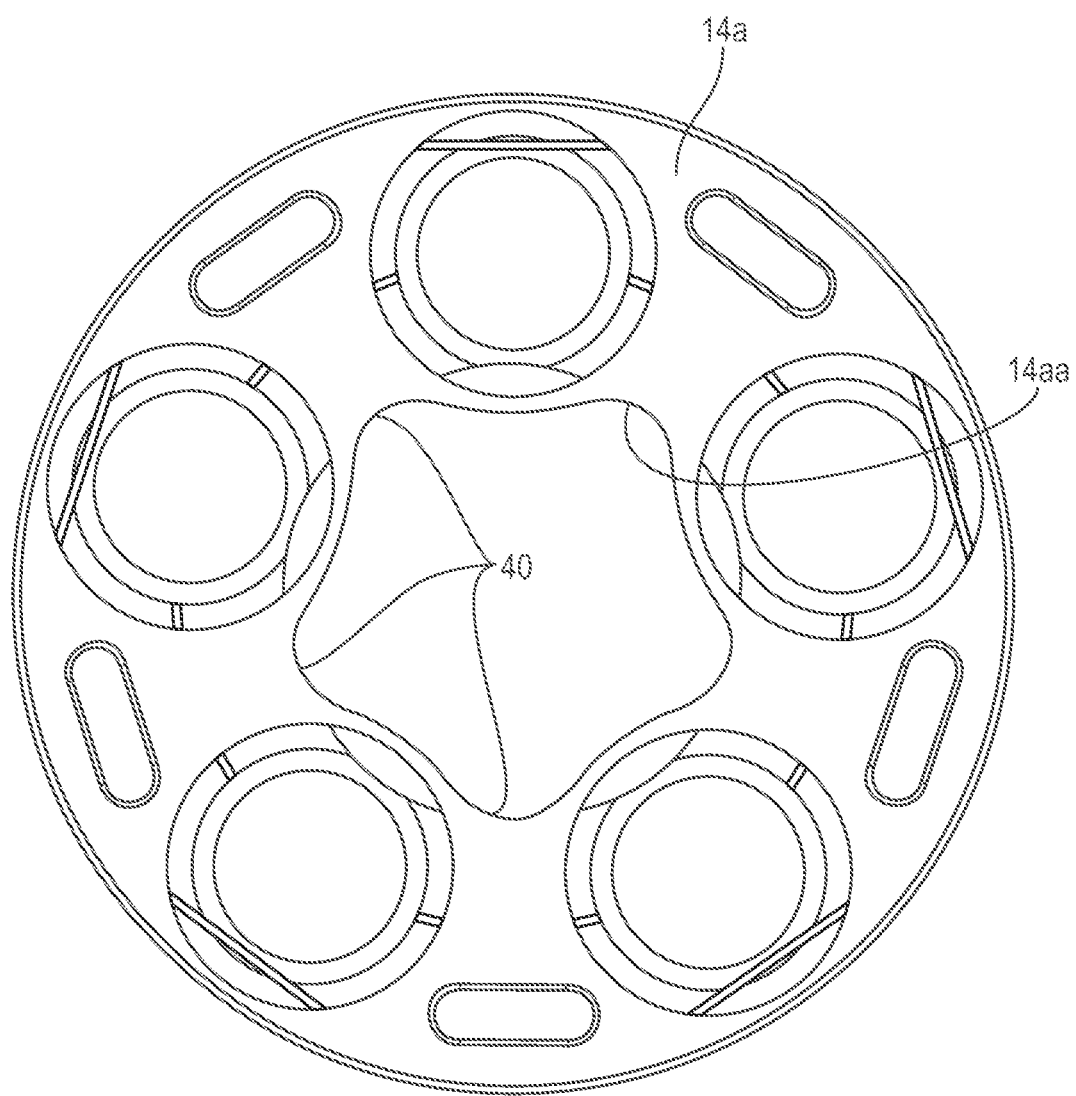
FIG. 18 is a view of the front face of the reduction gear of FIG. 3.

FIGS. 17 and 18 make it possible to see that the radially inner peripheral edge 14aa of the front radial wall 14a comprises notches 40 regularly distributed about the axis X to facilitate the mounting of the baffles and for example, that comprising the nozzle 38. This peripheral edge 14aa thus has a general star shape. The number of notches 40 is equal to the number of baffles 18 and therefore to the number of planet gears 8. The minimum number of notches 40 is equal to the number of nozzles 38, that is one single nozzle in the example represented. But, in order to gain by mass and to have a more regular/periodic shape, it is more advantageous to have the maximum number, that is the number of planet gears 8 or baffles 18. The interest in producing one single notch would be to need to deceive the mounting such that the baffle-nozzle cannot be mounted in one of the five positions which itself would not be intended.

Figure 19:
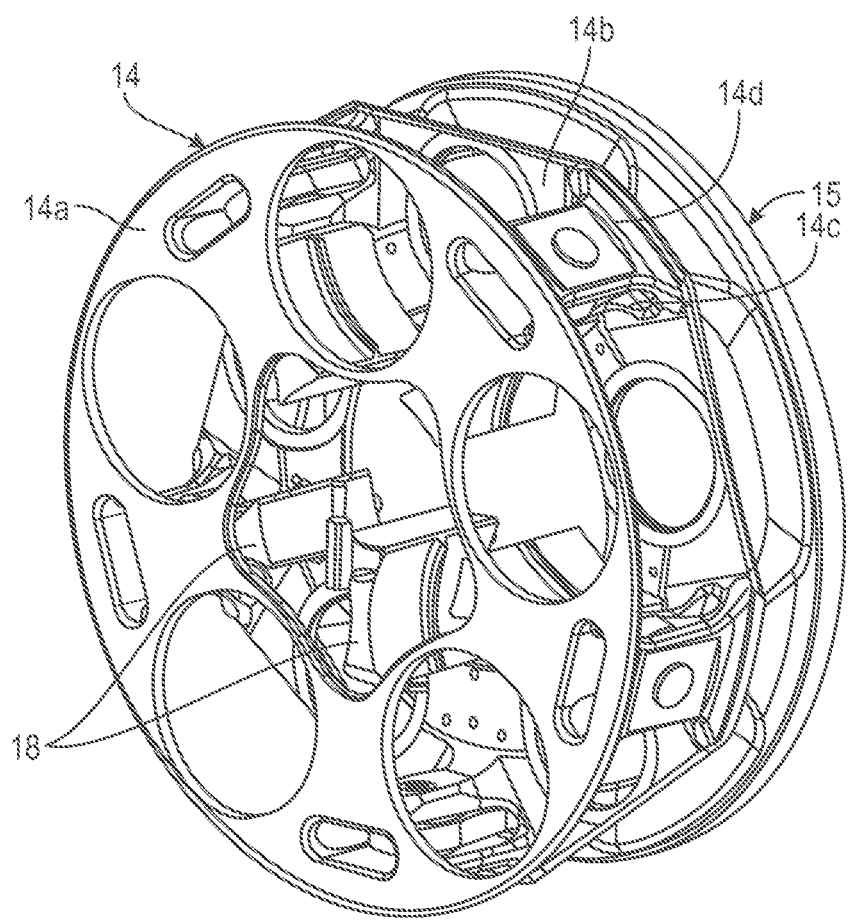
FIG. 19 is a schematic, perspective view of the reduction gear of FIG. 3, and shows a step of assembling this reduction gear.
Figure 20:
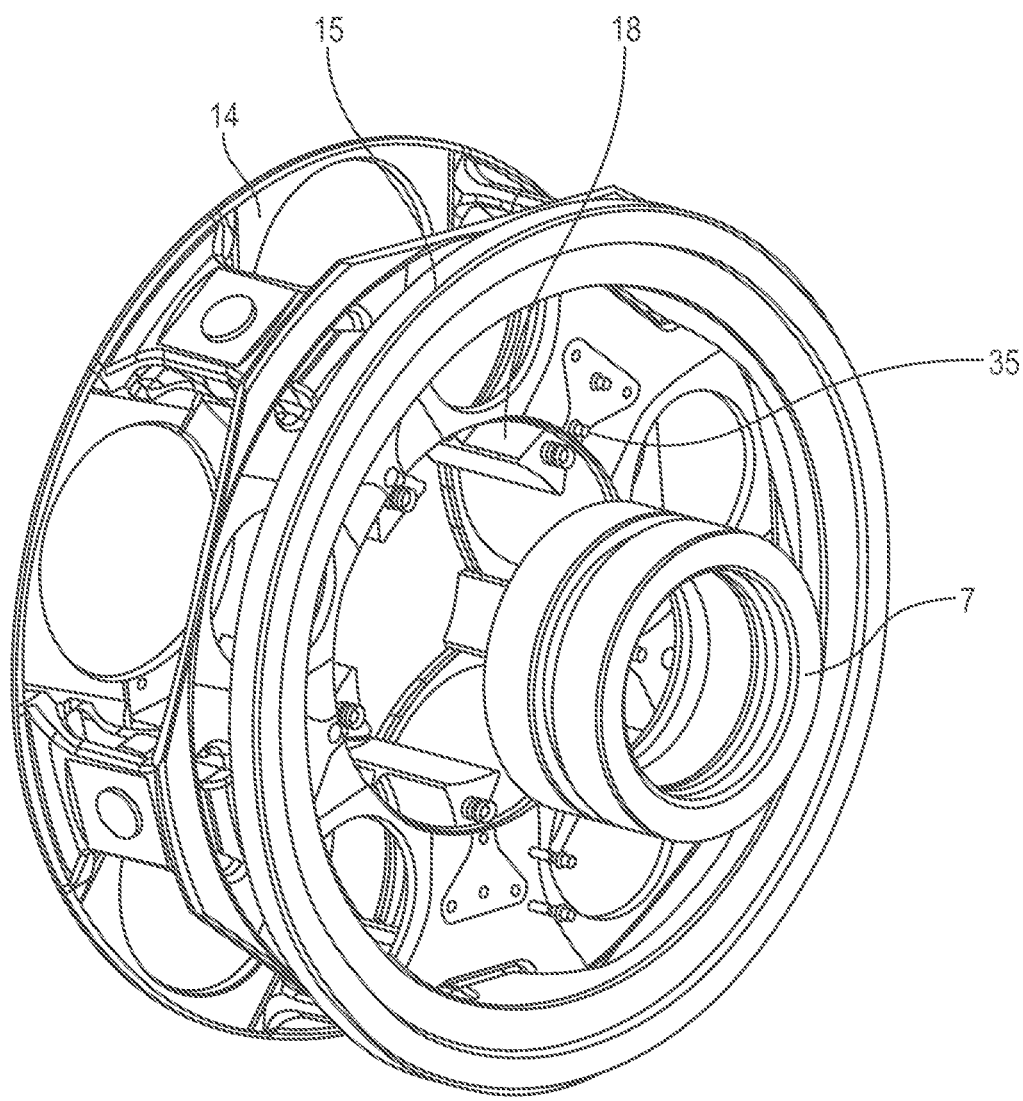
FIG. 20 is a schematic, perspective view of the reduction gear of FIG. 3, and shows a step of assembling this reduction gear.
Figure 21:
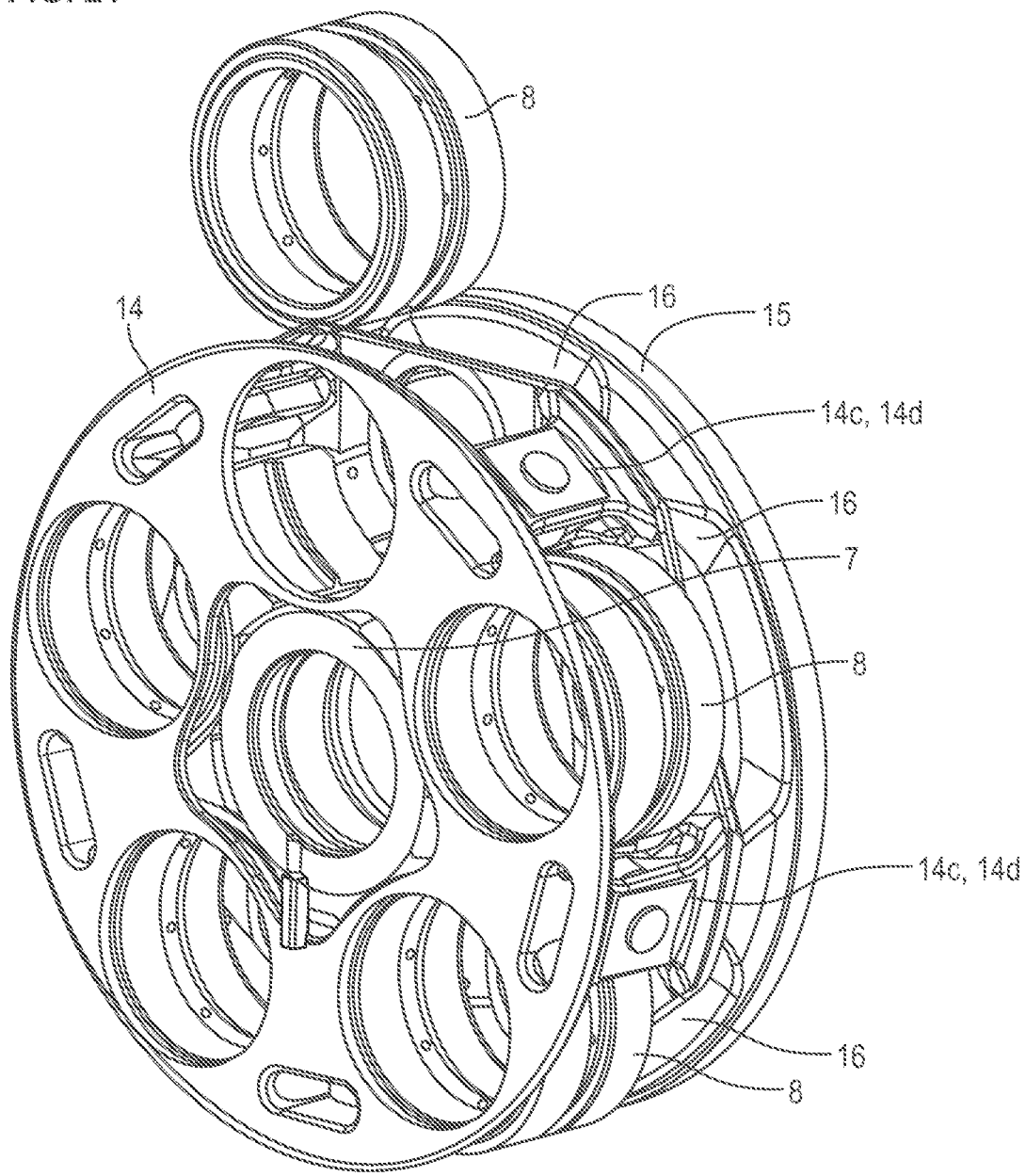
FIG. 21 is a schematic, perspective view of the reduction gear of FIG. 3, and shows a step of assembling this reduction gear.
Figure 22:
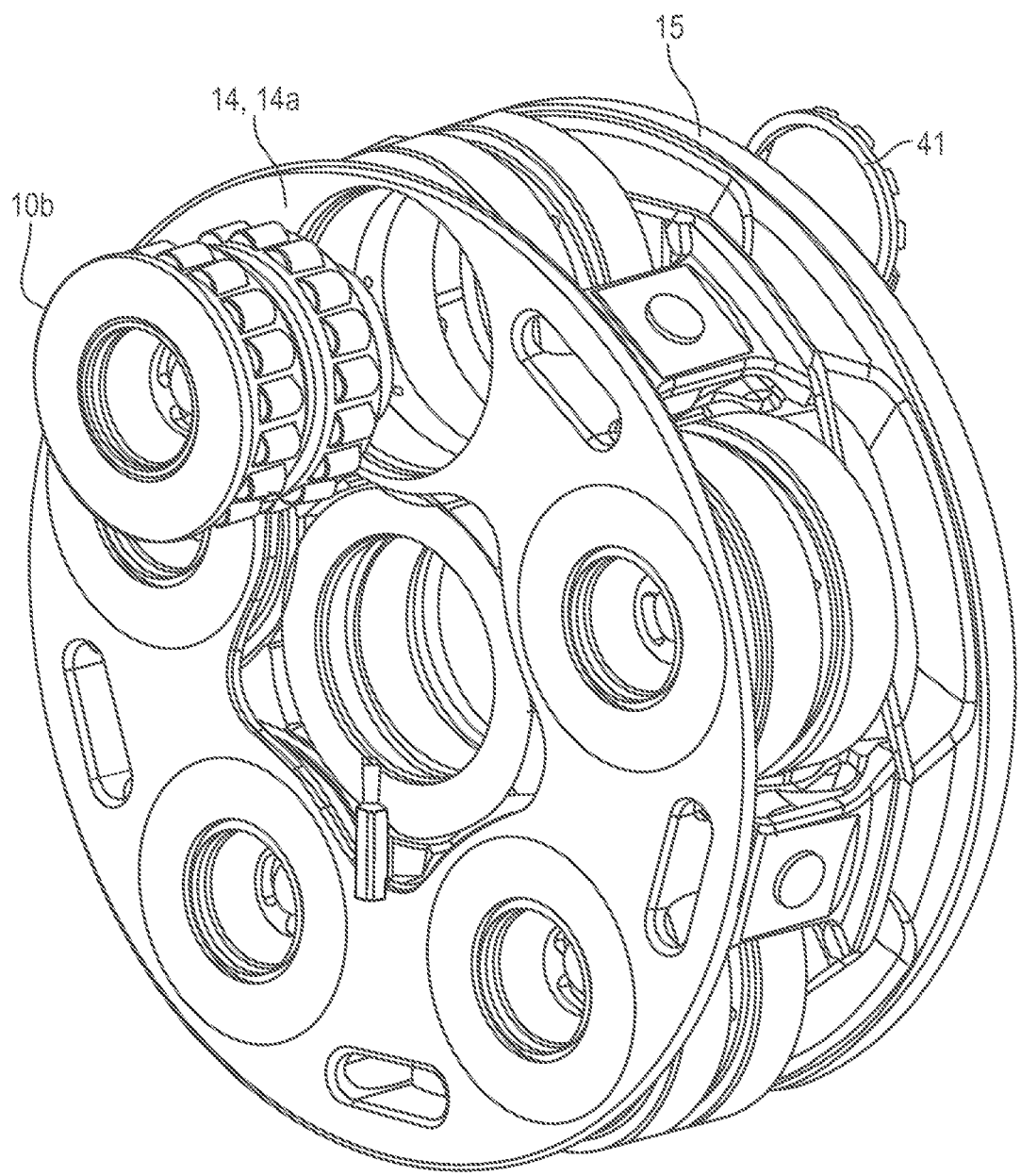
FIG. 22 is a schematic, perspective view of the reduction gear of FIG. 3, and shows a step of assembling this reduction gear.

FIGS. 19 to 22 illustrate steps of mounting the reduction gear 6 and for example, the baffles 18, the sun gear 7, the planet gears 8 and their axes 10b. A first step consists of arranging the baffles 18 in the cage 14 which is already fixed to the cage-carrier 15. The baffles are inserted after one another in the cage, through the central orifice of the front wall 14a then are moved radially outwards after one another, to be positioned such that their tapped holes are aligned with the orifices for the passage of screws 35 of the rear wall 14b (FIG. 19). Mounting them by sliding them through the spaces 16 is also possible. These screws 35 are thus screwed and clamped to fix the baffles 18 to the cage 14 (FIG. 20). The sun gear 7 is then inserted in the cage 14 by axial translation from the rear, through the central orifice of the rear wall 14b (FIG. 20). The planet gears 8 are then engaged after one another in the cage 14, by translation in the radial direction through the mounting spaces 16 situated between the pairs of staples 14c, 14d (FIG. 21). The axes 10b of the planet gears 8 are then inserted in their respective planet gears by axial translation from upstream, through the openings provided for this purpose over the front radial wall 14a (FIG. 22). A nut 41 is screwed on the rear end of each axis 10b and bears axially on the rear wall 14b in order to maintain the axes of the planet gears in the cage 14 (FIGS. 3, 4 and 22).

While illustrative embodiments have been illustrated and described, it will be appreciated that various changes can be made therein without departing from the spirit and scope of the invention.

The embodiments of the invention in which an exclusive property or privilege is claimed are defined as follows:

1. A lubricating oil distributor for a turbine engine mechanical reduction gear having an annular shape about an axis (X) and being formed of one single part, the lubricating oil distributor comprising: a first and a second independent oil circuit, the first independent oil circuit having a first oil inlet connected by a first annular chamber to several oil outlets distributed over a first circumference (C1) about the axis (X), and the second independent oil circuit having a second oil inlet connected by a second annular chamber to several oil outlets distributed over a second circumference (C2) about the axis (X), the first and second circumferences having different diameters,
wherein the first and second chambers are formed by two coaxial and closely linked tubular rings wherein a diameter of the first circumference (C1) is less than a plurality of ring diameters of the closely linked tubular rings, and wherein a diameter of the second circumference (C2) is greater than the plurality of ring diameters.

2. The lubricating distributor according to claim 1, wherein the first and second inlets are oriented in a radial direction with respect to the axis (X).

3. The lubricating distributor according to claim 1, wherein the first and second inlets are situated in a plane perpendicular to the axis (X) and are inclined against one another by a determined angle (a).

4. The lubricating distributor according to claim 1, wherein the first and second chambers have, in an axial cross-section, a circular shape.

5. The lubricating distributor according to claim 1, wherein the several oil outlets distributed over the second circumference are oriented axially in a same direction.

6. The lubricating distributor according to claim 1, further comprising fixing pads having orifices for passages of screws.

7. A planet-carrier for a turbine engine mechanical reduction gear, the planet-carrier comprising:
a cage defining a housing for receiving a central sun gear of axis (X) of rotation and of planet gears arranged around the sun gear; and
a lubricating distributor according to claim 1, being fixed on the cage.

8. The planet-carrier according to claim 7, wherein the cage comprises at its periphery housings configured to receive axial fingers integral with the planet-carrier of the reduction gear, each housing being passed through by a radial pin which is configured to guide in rotation a connecting means carried by one of the fingers, the first and second inlets of the distributor being oriented respectively according to a first direction and a second direction which each pass through a free space sector (S) delimited axially by the cage and the cage-carrier and extending circumferentially between two adjacent fingers.

9. A lubricating oil distributor for a turbine engine mechanical reduction gear having an annular shape about an axis (X) and being formed of one single part, the lubricating oil distributor comprising: a first and a second independent oil circuit, the first independent oil circuit having a first oil inlet connected by a first annular chamber to several oil outlets distributed over a first circumference (C1) about the axis (X), and the second independent oil circuit having a second oil inlet connected by a second annular chamber to several oil outlets distributed over a second circumference (C2) about the axis (X), the first and second circumferences having different diameters, wherein the first and second chambers have, in an axial cross-section, a circular shape.

10. A lubricating oil distributor for a turbine engine mechanical reduction gear having an annular shape about an axis (X) and being formed of one single part, the lubricating oil distributor comprising: a first and a second independent oil circuit, the first independent oil circuit having a first oil inlet connected by a first annular chamber to several oil outlets distributed over a first circumference (C1) about the axis (X), and the second independent oil circuit having a second oil inlet connected by a second annular chamber to several oil outlets distributed over a second circumference (C2) about the axis (X), the first and second circumferences having different diameters, wherein the first and second chambers are formed by two coaxial and closely linked tubular rings.

* * * * *